(12) United States Patent
Singhal et al.

(10) Patent No.: US 8,261,221 B2
(45) Date of Patent: Sep. 4, 2012

(54) COMPARING TIMING CONSTRAINTS OF CIRCUITS

(75) Inventors: Sonia Singhal, Santa Clara, CA (US); Loa Mize, Tigard, OR (US); Cho Moon, San Diego, CA (US)

(73) Assignee: Synopsys, Inc., Mountain View, CA (US)

( * ) Notice: Subject to any disclaimer, the term of this patent is extended or adjusted under 35 U.S.C. 154(b) by 221 days.

(21) Appl. No.: 12/759,625

(22) Filed: Apr. 13, 2010

(65) Prior Publication Data

US 2011/0252388 A1     Oct. 13, 2011

(51) Int. Cl.
*G06F 17/50*     (2006.01)
*G06F 9/455*     (2006.01)

(52) U.S. Cl. ........ 716/113; 716/107; 716/108; 716/132; 716/134; 716/136

(58) Field of Classification Search .......... 716/107–108, 716/113, 132, 134, 136
See application file for complete search history.

(56) References Cited

U.S. PATENT DOCUMENTS

| | | | | |
|---|---|---|---|---|
| 5,528,511 A | * | 6/1996 | Hasegawa | 716/108 |
| 6,308,306 B1 | * | 10/2001 | Kaneko | 716/113 |
| 6,487,705 B1 | | 11/2002 | Roethig et al. | |
| 7,284,219 B1 | * | 10/2007 | Manaker et al. | 716/108 |
| 7,698,674 B2 | * | 4/2010 | Kalafala et al. | 716/113 |
| 2004/0210861 A1 | | 10/2004 | Kucukcakar et al. | |
| 2008/0301598 A1 | | 12/2008 | Gangadharan et al. | |
| 2009/0326873 A1 | | 12/2009 | Wang et al. | |

OTHER PUBLICATIONS

PCT International Search Report and Written Opinion, PCT Application No. PCT/US2011/032268, Oct. 25, 2011, 9 pages.
Gangadharan, S. et al., "Preserving the Intent of Timing Constraints", EDA Design Line, May 17, 2008, [Online] [Retrieved on Nov. 5, 2010] Retrieved from the Internet<URL:http://www.edadesignline.com/207800772?printableArticle=true>.

* cited by examiner

*Primary Examiner* — Nghia Doan
(74) *Attorney, Agent, or Firm* — Fenwick & West LLP

(57) ABSTRACT

Timing behaviors associated with constraints of circuits are compared to identify mismatches between circuit configurations. Aggregate sets of timing constraints associated with timing nodes are determined for timing paths between start points and end points. Precedence rules are applied to aggregate sets of timing constraints by applying precedence rules to interacting timing constraints. Aggregate sets of constraints for corresponding timing nodes are matched to determine if timing constraint mismatches exist between circuits. If aggregate timing constraints associated with start point, end point pairs are found to match, reconvergent points between the start point and end points are analyzed to see if aggregate constraints of timing nodes connected to reconvergent/divergent points match if timing exception matches are involved. Graph traversal algorithms allow efficient computation of aggregate timing constraints for timing nodes.

21 Claims, 23 Drawing Sheets

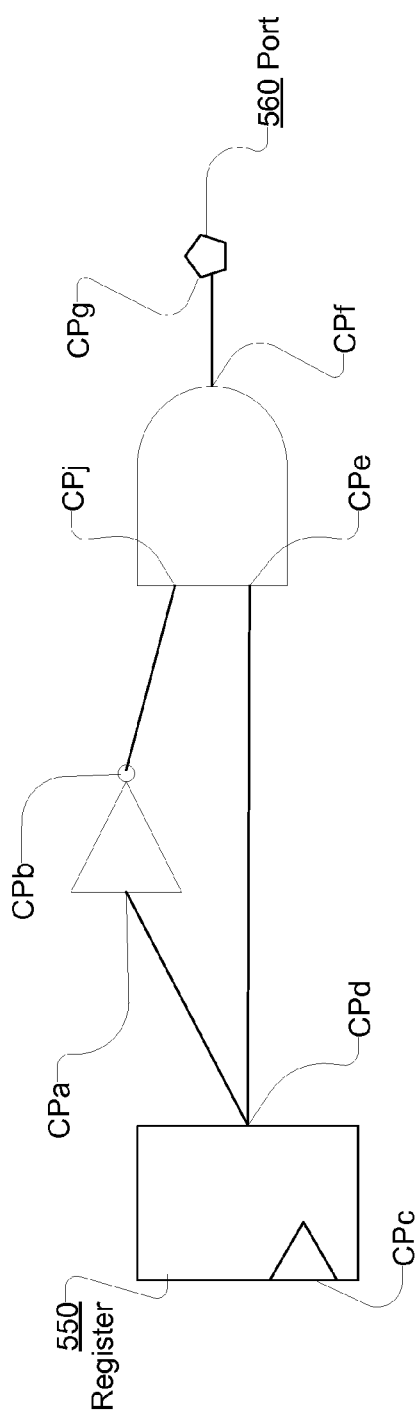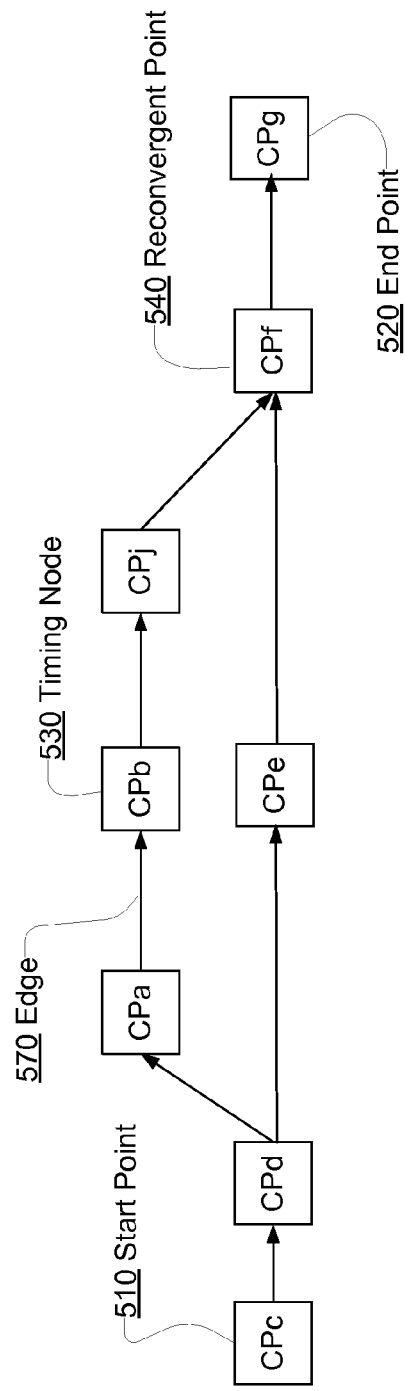
FIG. 5(a)
FIG. 5(b)

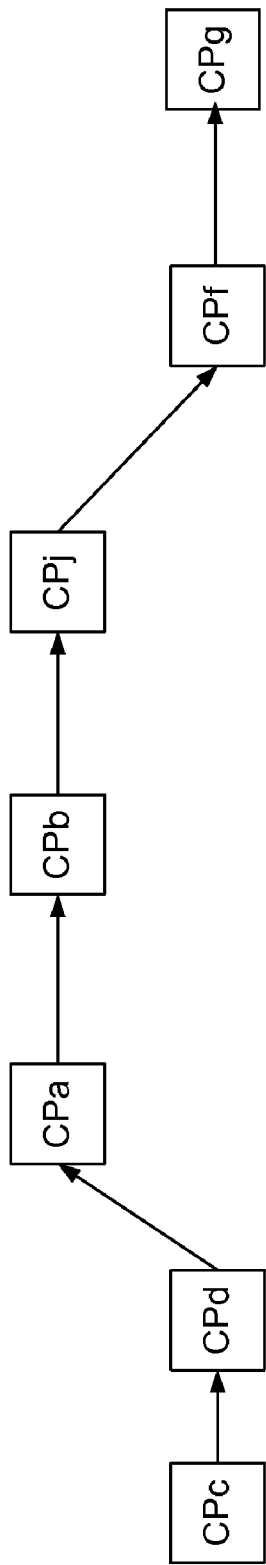
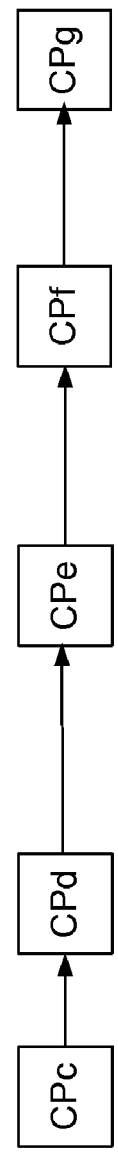
FIG. 6(a)
FIG. 6(b)

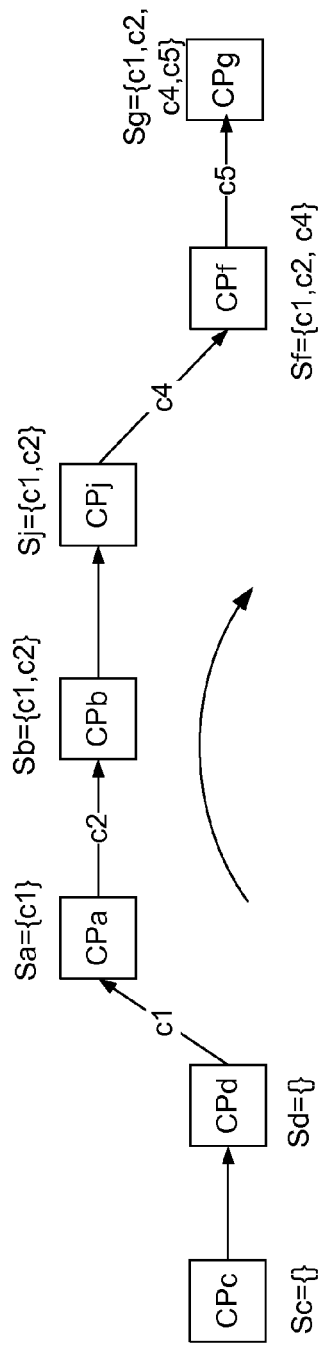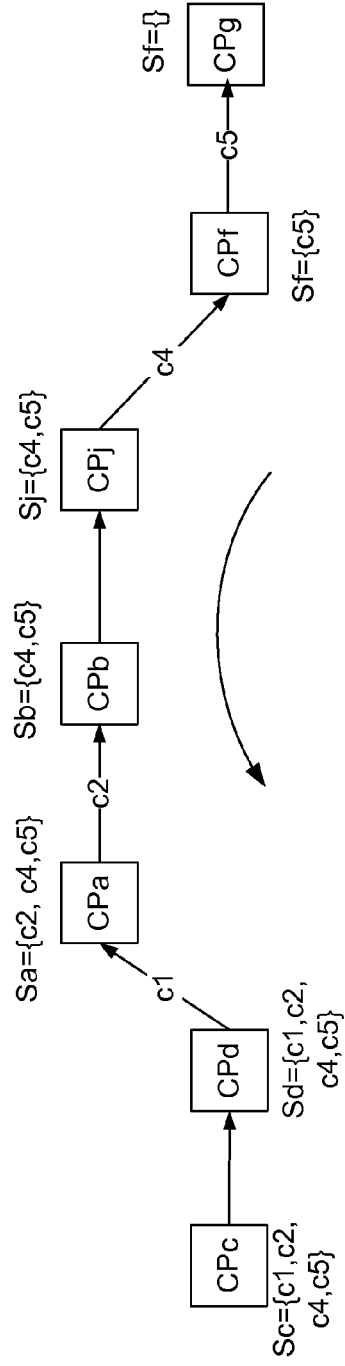
FIG. 7(a)
FIG. 7(b)

COMPARING TIMING CONSTRAINTS OF CIRCUITS

FIELD OF THE INVENTION

This invention relates generally to electronic design automation (EDA) of circuits and in particular to comparison of timing constraints for circuits.

BACKGROUND

Due to the large number of components in state of the art electronic circuits, most of their design and production is computer implemented. A representation of a circuit in a computer often includes a netlist and a set of timing constraints. Timing constraints might include specifications of clock signals, delay requirements at inputs and outputs in the circuit, and various exceptions, for example, specifications of false paths, multi-cycle paths, minimum or maximum delays and the like. Timing constraints can be automatically generated by tools or manually added/modified. Timing constraints for circuits can be specified using a text file representation, for example, using a SYNOPSYS DESIGN CONSTRAINTS (SDC) file.

One possible process in EDA compares timing constraints for different circuits (e.g., different versions of the same circuit). For example, during the circuit design process, a later description of a circuit may be obtained by performing transformations on an earlier description of the circuit. It may be desirable to compare the timing constraints of the two circuits, for example to ensure that the timing constraints are equivalent and no changes were introduced as a result of the transformation. Timing constraints may also be compared for allegedly equivalent circuits produced by different sources.

Conventional techniques for comparing timing constraints have some drawbacks. One approach is to structurally compare timing constraints of two circuits by doing iterative pairwise comparison of individual constraints. This approach can produce false positive results (incorrect reporting of mismatches as matches) because some circuit changes may alter the way in which the constraints are applied, resulting in different timing behaviors despite two circuits having the identical set of timing constraints. In addition, such approaches can produce false negative results (incorrect reporting of matches as mismatches) because two timing constraints, even though they do not match structurally, can produce the same timing behavior on the circuit. Thus, there is a need for improved approaches to comparing timing constraints for different circuit descriptions.

SUMMARY

The above and other issues are addressed by a computer-implemented method, computer system, and computer program product for comparing circuit configurations comprising timing nodes, edges between timing nodes and timing constraints. A first source set of timing nodes and a first sink set of timing nodes is identified in the first circuit configuration. A second source set of timing nodes and a second sink set of timing nodes is identified in the second circuit configuration such that the timing nodes in the second source set correspond to the first source set and the timing nodes in the second sink set correspond to the first sink set. A first aggregate set of timing constraints is determined for timing paths form the first source set to the first sink set. The aggregation of the timing constraints accounts for interactions between timing constraints of the timing paths. Similarly a second aggregate set of timing constraints is determined for timing paths from the second source set to the second sink set. A determination is made whether the first aggregate set of timing constraints is equivalent to the second aggregate set of timing constraints.

In one embodiment, the determination of the aggregate set of timing constraints of the timing paths from a source set to a sink set of timing nodes comprises aggregation of all timing constraints encountered in a traversal of all timing paths from the source set to the sink set. In another embodiment, if a determination is made that the aggregate sets of timing constraints from the first circuit configuration is not equivalent to the aggregate set of timing constraints from the second circuit configuration, a mismatch is flagged between the two circuit configurations. For those endpoints with matching aggregate set of timing constraints it is inconclusive whether each path represented by the aggregate matches. In some embodiments, further comparison of start point to end point pairs is performed and in some cases reconvergent point comparison on the portions of the circuit is performed where necessary.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 5(a)-(b) show an example circuit configuration illustrating various terms related to a circuit.

FIGS. 6(a)-(b) illustrate examples of timing paths in a circuit configuration.

FIG. 7(a)-(b) illustrate aggregation of constraints associated with timing paths in the circuit configuration of FIG. 6.

DETAILED DESCRIPTION

Figure 1:
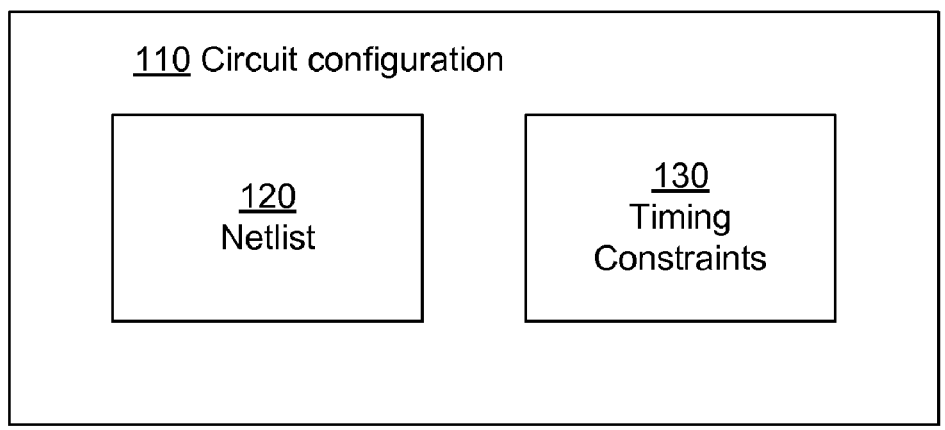
FIG. 1 illustrates a circuit configuration comprising netlists and timing constraints.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures Timing Constraints FIG. 1 shows a representation of an electronic circuit in a computer, which will be referred to as a circuit configuration 110. A circuit configuration 110 includes a description of the components of the circuit and the connections between the circuits specified as netlists 120 and a representation of the timing constraints 130 for the circuit.

Timing constraints can be specified using various commands, for example, set_multicycle_path, set_max_delay, set_min_delay, set_false_path, set_disable_timing, set_clock_groups, set_case_analysis and the like. There is a subset of timing constraints called exceptions that deal with path delays or relaxing or ignoring some constraints. Examples of exceptions include set_multicycle_path, set_max_delay, set_min_delay and set_false_path commands. The set_multicycle_path command specifies the number of clock cycles that a data path can be relaxed by for setup or hold. The set_max_delay command specifies a required maximum delay for timing paths in a circuit design. The set_min_delay command specifies a required minimum delay for timing paths in a circuit design. The set_false_path command identifies circuit paths in a design that can be ignored (or marked as "false") so that they are not considered during timing analysis. The set_disable_timing command disables timing through specified circuit components, for example, cells, pins, ports etc. The command set_clock groups specifies clock groups that are mutually exclusive or asynchronous with each other in a design so that paths between these clocks are not considered during timing analysis. The command set_case_analysis specifies that a port or pin is at a constant logic value of 1 or 0.

If multiple timing constraints are satisfied for a given path, a particular timing constraint is selected based on a set of predetermined precedence rules. For example, one precedence rule might be that a set_false_path constraint takes precedence over the set_max_delay path constraint. Then, if there are two constraints satisfied for a path, "set_max_delay—to A 5" and "set_false_path—to A," based on this precedence rule, the set_false_path constraint is dominant over the set_max_delay command. The precedence rules may be based on various criteria, for example, a specific type of constraint may always take precedence over another type of constraint, a constraint that provides more specific details may take precedence over a less specific constraint, or specific precedence rules may be specified by users.

A timing constraint may be applicable to multiple timing paths. For example, constraint "set_max_delay—from A" applies to all paths that start from point A, whereas constraint "set_false_path—to B" applies to all paths that end at B. However if there is a path from A to B, then the two constraints "set_max_delay—from A" and "set_false_path—to B" are both satisfied but will conflict. Based on the above precedence rule, the set_false_path constraint is dominant for paths that begin with A and end at B, but the set_max_delay constraint is dominant for paths that begin with A but do not end in B.

Figure 2:
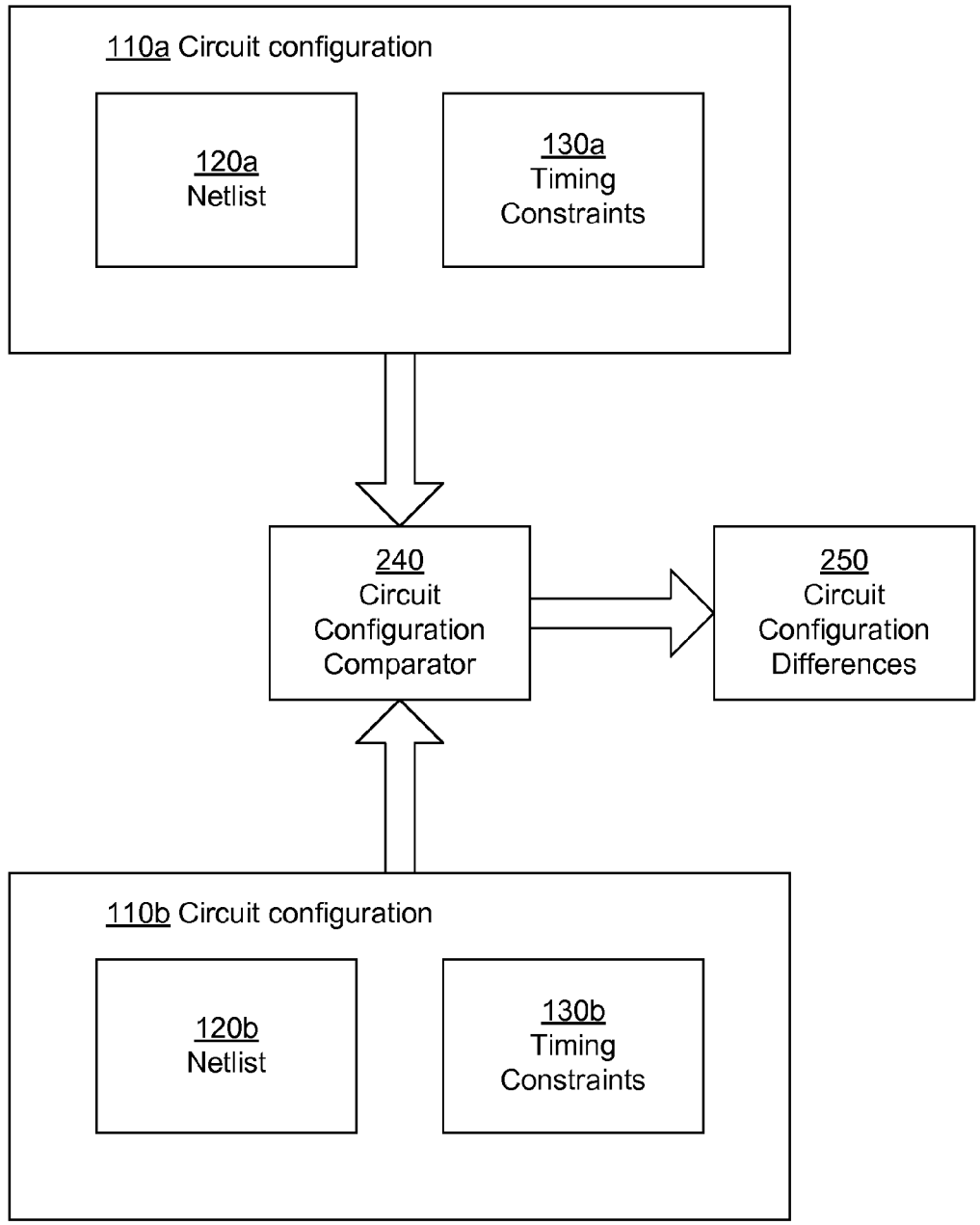
FIG. 2 is a block diagram illustrating comparison of timing constraints of two circuit configurations.

FIG. 2 is a high-level block diagram illustrating comparison of timing constraints of two circuit configurations. The two circuit configurations 110a and 110b are inputs to a circuit configuration comparator 240. The circuit configuration 110a includes a netlist specification 120a and a timing constraints specification 130a. The circuit configuration 110b includes a netlist specification 120b and a timing constraints specification 130b. The circuit configuration comparator 240 generates circuit configuration differences 250 based on differences in the timing constraints 130. For example, if there are no effective timing constraint differences between circuit configurations 110a and 110b, the circuit configuration differences 250 indicate the two circuit configurations are equivalent. On the other hand, if there are timing constraint differences between circuit configurations 110a and 110b, the circuit configuration differences 250 might specify the details of the netlists or inputs/outputs that correspond to timing constraints differences as well as the corresponding timing constraints that do not match.

Interaction of Timing Constraints

Timing constraints of two circuits can be compared by iterative pairwise comparison of individual constraints. For example, the circuit configuration comparator 240 can attempt to pair each timing constraint in 130a with a corresponding timing constraint in 130b and determine whether the paired constraints are equivalent. The iterative pairwise comparison may be performed for all constraints of a particular type together, for example, the comparison of all set_case_analysis and then clocks, input/output delays, exceptions, followed by comparisons of clock latencies, followed by comparisons of clock uncertainty, and so on.

Figure 3:
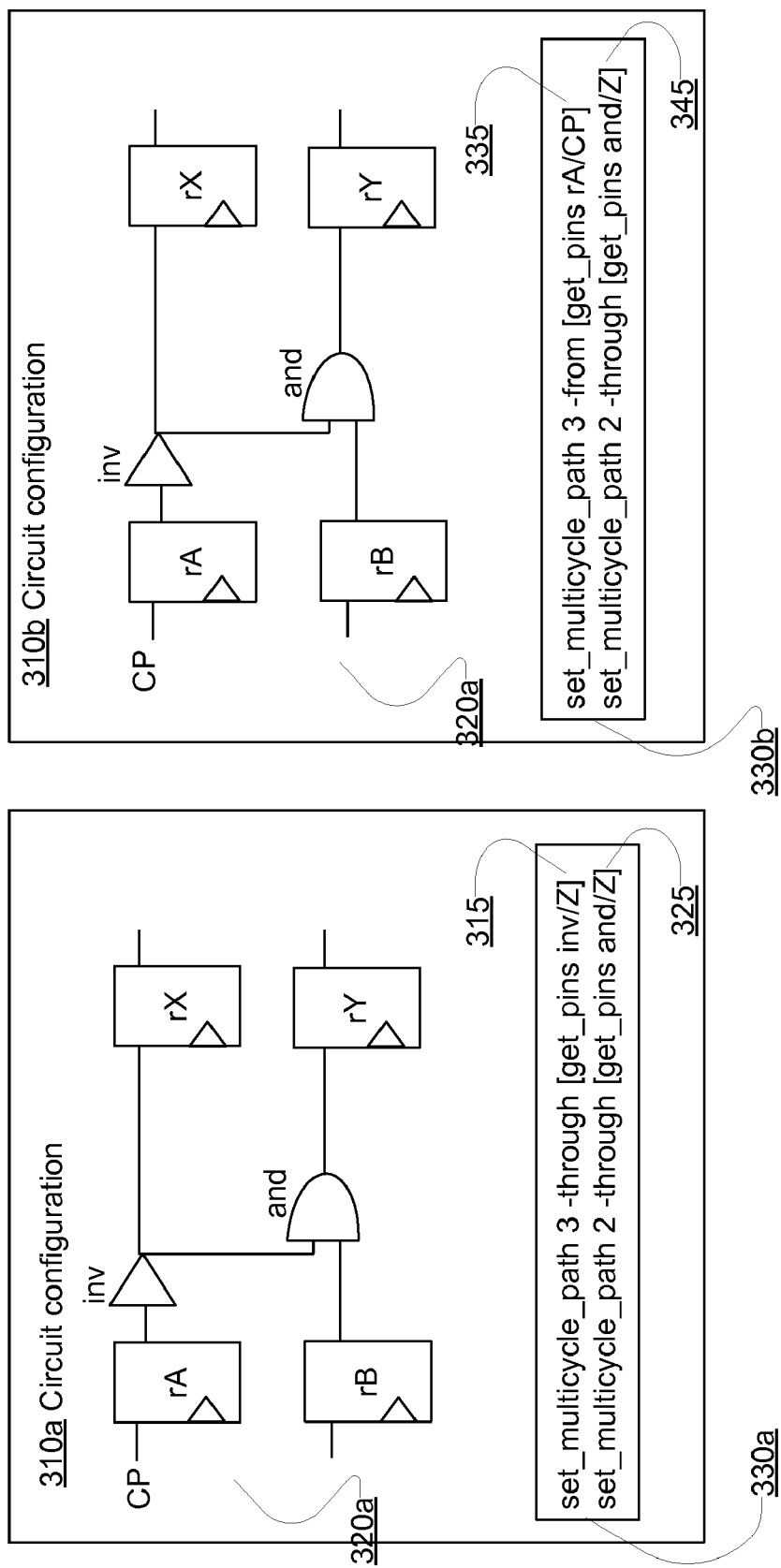
FIG. 3 illustrates two circuit configurations for a circuit with a mismatch in timing constraints that may not be identified by a process based on iterative pairwise comparison of timing constraints.
Figure 4:
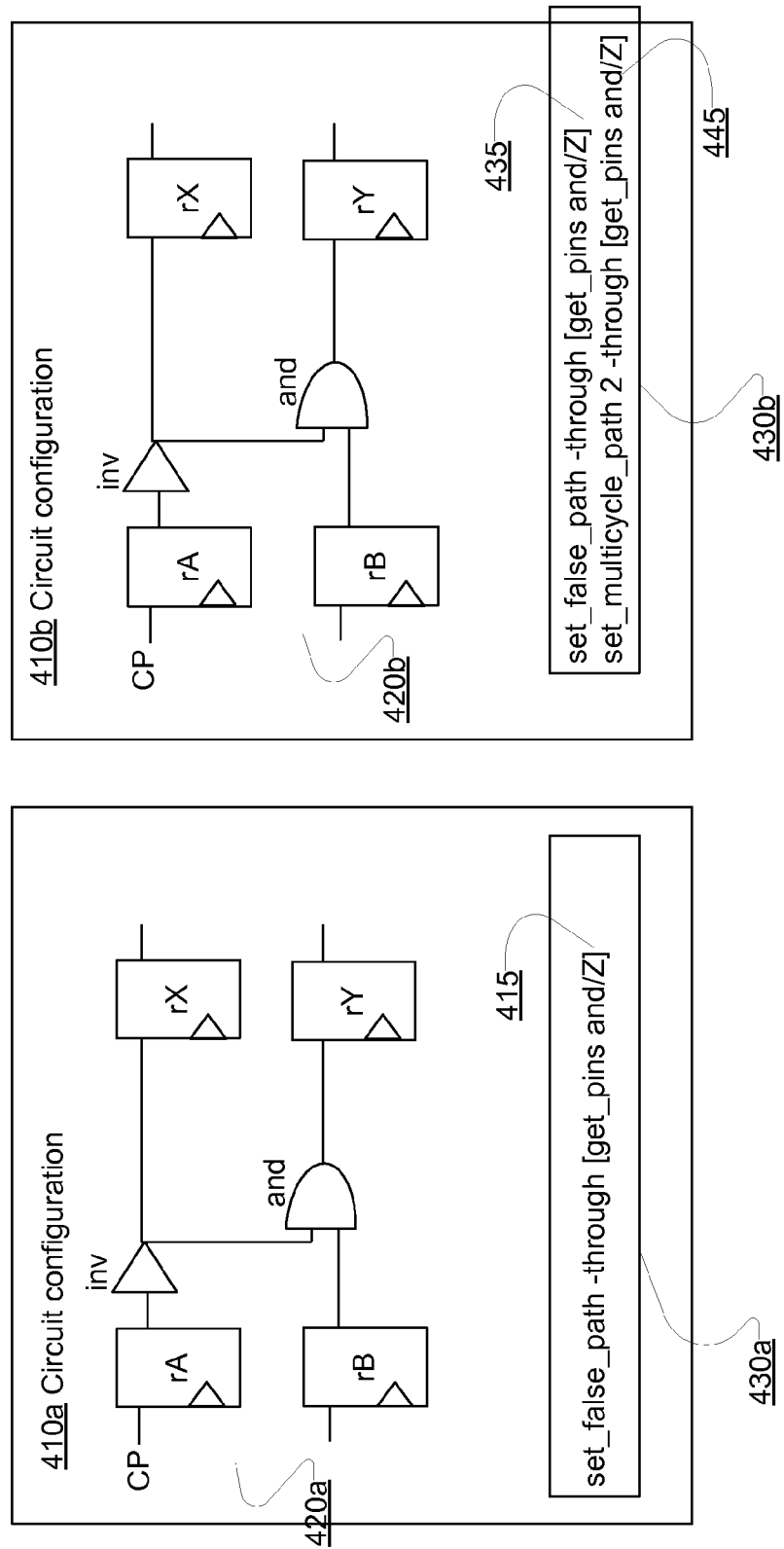
FIG. 4 shows an example of a false mismatch shown by iterative pairwise comparison of timing constraints due to a redundant timing constraint in one of the circuit configurations.

However, pairwise comparison of constraints does not take into consideration various interactions between timing constraints. As a result, pairwise comparison of constraints may not detect all mismatches or may report false mismatches. FIGS. 3 and 4 illustrate two examples.

FIG. 3 illustrates two circuit configurations 310a and 310b for a circuit being compared to detect timing constraints mismatches. The netlist specifications 320a and 320b for the two circuit configuration 310 are identical. However, the timing constraints 330a include a constraint 315 "set_multicycle_path 3—through [get_pins inv/Z]," whereas the timing constraints in 330b include a constraint 335 "set_multicycle_path 3—from [get_pins rA/CP]." The constraint 325 in timing constraints 330a is identical to the timing constraint 345 in timing constraints 330b. An iterative pairwise comparison may conclude that the constraint 315 is equivalent to constraint 335 and there is no mismatch between the timing constraints 330a and 330b.

However, the timing constraints associated with the path from register rA through pin inv/Z through pin and/Z to register rY may be resolved differently for circuit configurations 310a and 310b based on precedence rules. For the path from register rA through pin inv/Z through pin and/Z to register rY in circuit configuration 310a both constraints 315 and 325 are applicable and the precedence rules may determine that the resulting constraint is 325 with the most constraining multi-cycle path of 2 cycles. On the other hand, in circuit configuration 310b, again both constraints 335 and 345 are applicable to the path from register rA through pin inv/Z through pin and/Z to register rY and the precedence rules may determine that the resulting constraint is 335 with a multi-cycle path of 3 cycles because 335 is a multicycle path that originates from a clock pin. As a result, due to the interaction of different constraints, a comparison of timing constraints for the two circuit configurations should flag a mismatch for pin inv/Z. However, an iterative pairwise comparison of the two circuit configurations 310 does not consider the interactions between the constraints for a circuit configuration and may determine that there is no mismatch between the two circuits.

FIG. 4 shows an example of circuit configurations that can falsely be flagged as a timing mismatch by a circuit configuration comparator 240 that uses iterative pairwise configuration. FIG. 4 shows two circuit configurations 410a and 410b with identical netlists 420a and 420b respectively. The timing constraints specification 430a includes one command whereas timing constraints specification 430b includes two commands. The constraint 415 in timing constraints specification 430a is the same as constraint 435 in timing constraints specification 430b. An iterative pairwise comparison of the two timing constraints specifications 430a and 430b may attempt to match the above pairs of constraints and determine that the constraint 445 does not have a matching constraint in 430a. As a result, an iterative pairwise comparison of the two circuit configurations may report a mismatch in the timing constraints of the two circuit configurations 410a and 410b.

However, the constraints 435 and 445 apply to the same timing paths and precedence rules can be used to determine if a constraint can be eliminated. For example, if precedence rules decide that a set_false_path command overrides a set_multicycle_path command, the timing constraints 445 can be eliminated. Accordingly, the two sets of timing constraints 430a and 430b are identical and there is no timing mismatch between the two circuit configurations 410a and 410b. Therefore, a false mismatch can be reported by iterative pairwise comparison of timing constraints even if there is no real mismatch as determined by considering interactions between timing constraints.

False mismatches reported by a tool may require further analysis of the circuits causing unnecessary delays in completing the design process. On the other hand, failure to report timing mismatches may result in faulty signoff and incorrect operation of the circuit.

Graph Representation

Embodiments of the invention address the above problems by using a process that takes into consideration interactions between timing constraints. In one approach, the process is illustrated by using a graph representation of a circuit. FIG. 5 shows timing paths in an example circuit, which will be used to illustrate various terms and a corresponding graph representation of the circuit. A timing node is an input or output of a component of a circuit that is analyzed for potential timing delays over netlists including the timing node. In one embodiment, a timing node is any pin or port of the circuit or a clock pin of a register. For example, as shown in FIG. 5(a) the various pins or ports CPa, CPb, CPc, etc. are timing nodes.

A timing node where a timing analysis can originate from will be referred to as a start point. As shown in FIG. 5(a), the clock pin CPc for the register 550 is a timing node that is a start point 510 in the corresponding graph of FIG. 5(b). In the graph representation of the circuit as shown in FIG. 5(b), the start point of the circuit is the timing node that has no incoming edges to the timing node within the circuit being considered.

A timing node where a timing analysis can terminate at will be referred to as an end point 520. Port 560 that corresponds to timing node CPg is an end point in FIG. 5(a). In the graph representation of the circuit as shown in FIG. 5(b), the end point is a timing node that has no outgoing edges. Certain applications can analyze a portion of a larger circuit, called a block of the circuit for timing constraints. For example, multiple representations of a block of the circuit can be compared to identify timing constraints mismatches. Portions of the circuit outside of the block can interact with the block, for example, provide input signals to the block or receive output signals from the block.

The netlist shown in FIG. 5(a) is represented as a graph comprising nodes and edges as shown in FIG. 5(b). The nodes in the graph of FIG. 5(b) are represented by squares and correspond to the timing nodes in the circuit of FIG. 5(a). The edges in FIG. 5(b) are represented by arrows and correspond to FIG. 5(b)'s connections between timing nodes. For example, timing nodes CPa and CPb are connected by an edge whereas timing nodes CPa and CPe do not have an edge between them. An edge connecting two timing nodes can cause delays in the signal travelling between the two timing nodes.

If two timing paths between a start point and end point follow different paths and then converge at a timing node, the timing node is called a reconvergent point 540. For example, in FIG. 5(b), the two timing paths between start point CPc and end point CPg diverge at timing node CPd and converge again at timing node CPf. The timing node CPf is called a reconvergent point and the timing node CPd is called a divergent point. In some embodiments, analysis of the circuit configuration can be performed to identify all reconvergent/divergent points before comparing timing constraints.

FIG. 6 illustrates examples of circuit paths based on the circuit illustrated in FIG. 5. A circuit path is the set of nodes and edges that are traversed to reach from a start point to an end point. The graph of FIG. 5(b) has two circuit paths that connect start point CPc to the end point CPg, shown in FIGS. 6(a) and 6(b). A circuit path in combination with a clock input can be called a timing path. There can be multiple clock inputs to a circuit path. Clock inputs to a circuit path can be represented as tags or timing constraints for the circuit path.

Timing Constraint Analysis

In an embodiment, timing constraint analysis is performed by aggregating timing constraints for timing nodes along a timing path while traversing from a start point to an end point. Alternatively, the timing constraints can be aggregated while traversing from an end point to a start point, in the reverse direction of the edges. An edge in the timing path can be associated with zero or more constraints.

FIG. 7(a) shows the result of aggregating constraints at each timing node as a result of traversing the timing path from start point CPc to the end point CPg. The set of constraints for a timing node is obtained by aggregating the constraints of the previous timing node encountered with the constraints associated with the edge connecting the previous timing node to the current timing node. For example, the set of constraints for CPc and CPd indicated by Sc and Sd respectively are empty sets. However, while traversing the edge from CPd to CPa, the constraint c1 is encountered and the set of constraints Sa for timing node CPa includes the timing constraint c1. The set Sb associated with timing node CPb aggregates the constraints associated with the previous timing node CPa indicated by Sa with the timing node c2 encountered on the edge from CPa to CPb resulting in Sb={c1,c2}. Similarly set Sf associated with timing node CPf is obtained by aggregating set Sj={c1,c2} with the constraint c4 associated with the edge from CPj to CPf, resulting in Sf={c1,c2,c4}.

FIG. 7(b) illustrates the corresponding aggregates of constraints obtained while traversing the timing path in the reverse direction from the end point CPg to CPc. For a given timing path between a pair of start point and end point, the aggregate set of constraints obtained at the end of the traversal is the same, whether the traversal is performed from the start point to the end point (forward direction) or from the end point to the start point (reverse direction).

Figure 8:
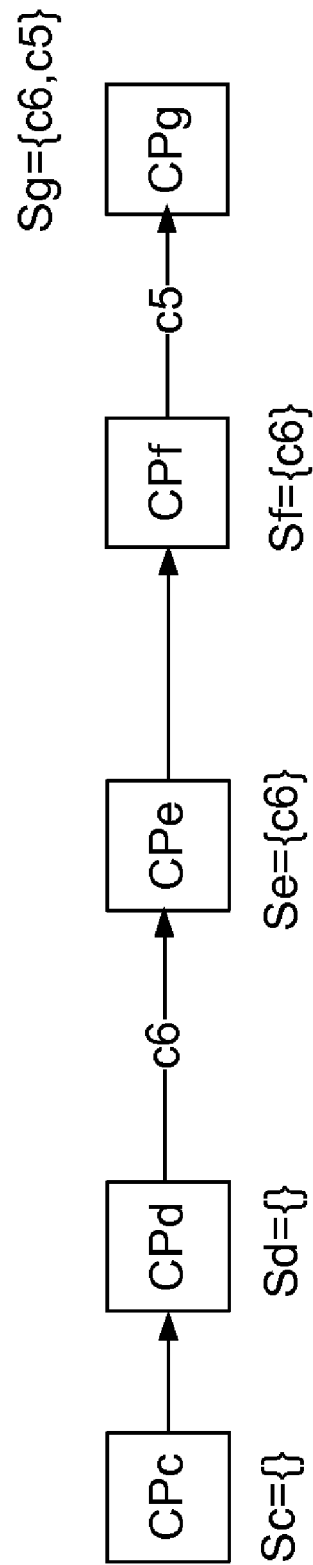
FIG. 8 illustrates aggregation of constraints associated with an alternate timing path in the circuit configuration of FIG. 6.
Figure 9:
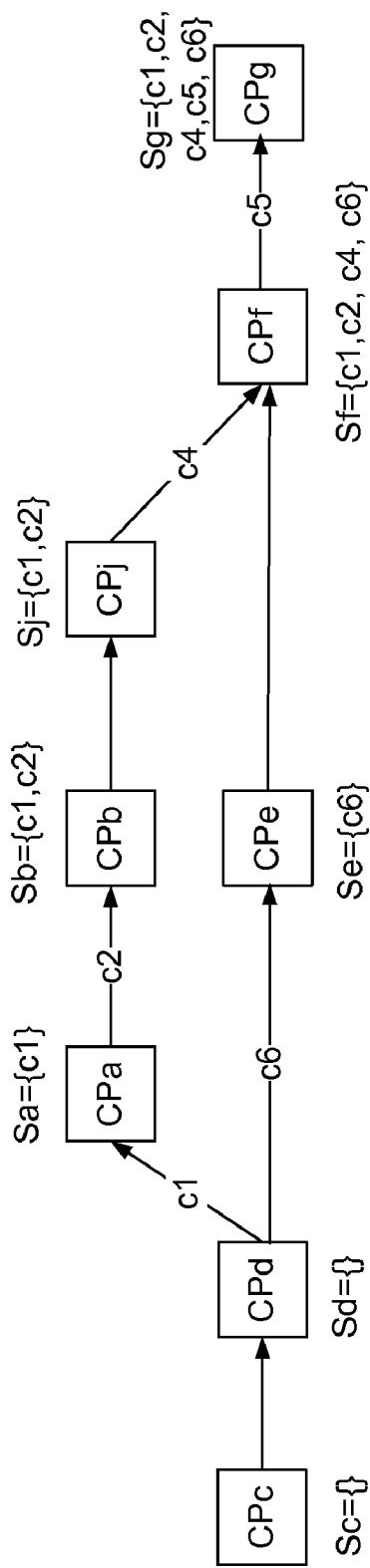
FIG. 9 illustrates aggregation of constraints associated with multiple timing paths in the circuit configuration of FIG. 6.

If there are multiple timing paths between a start point and an end point, the aggregates of constraints for the timing nodes can be computed for each timing path. For example, FIG. 8 shows the aggregate constraints for the timing path shown in FIG. 6(b) while traversing from the start point CPc to the end point CPg. FIG. 9 shows the combined aggregate constraints encountered for both the timing paths shown in FIGS. 6(a) and 6(b). A reconvergent point is associated with more than one timing paths and the aggregate constraints for the reconvergent point include the constraints associated with each timing path converging at the reconvergent point. For example, as shown in FIG. 9, the set of constraints Sf includes the constraint c6 that is encountered in the timing path shown in FIG. 8 and the constraints c1, c2, and c4 encountered while traversing the timing path shown in FIG. 7(a). Similarly a divergent point is associated with more than one timing paths. While aggregating constraints in the reverse direction of the edges, the aggregate constraints for the divergent point include the constraints associated with each timing path diverging from the divergent point.

Figure 10:
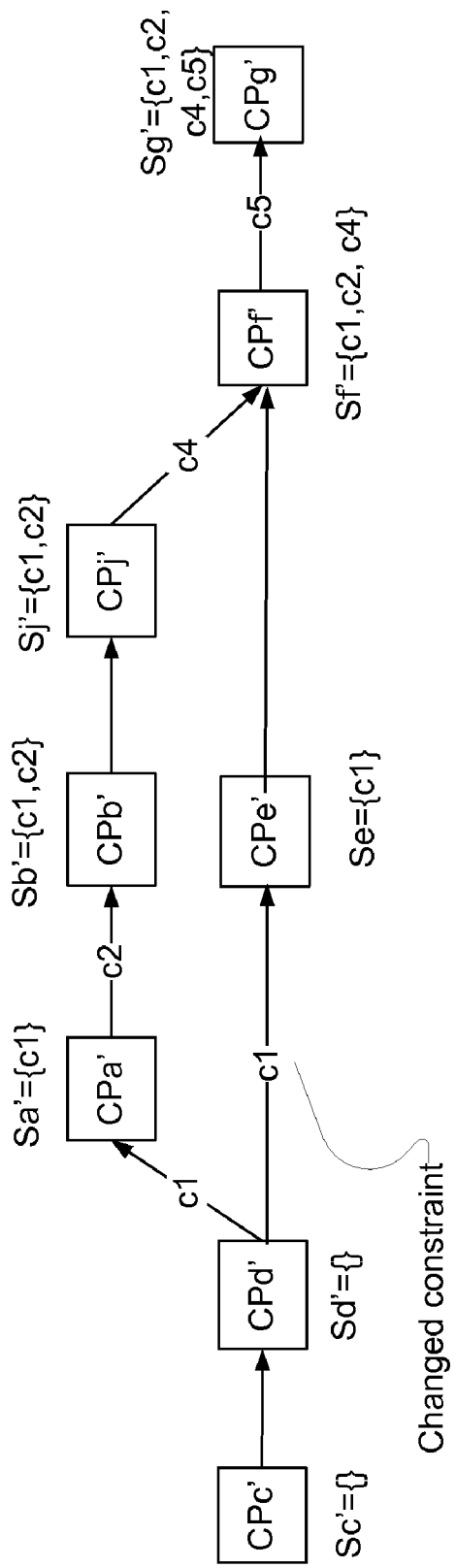
FIG. 10 illustrates comparison of aggregate sets of constraints for the circuit configuration in FIG. 6 with another circuit configuration.

An embodiment of the invention compares corresponding (start point, end point) pairs between two circuit configurations by comparing the aggregate sets of constraints obtained at each end point while traversing from the corresponding start point. For example, the corresponding timing paths in a second circuit configuration are indicated in FIG. 10. In FIG. 10, the timing constraint between the timing node CPd' and CPe' is c1 which is different from the constraint c6 between the timing node CPd and CPe in FIG. 9. As a result the set Sg' of constraints obtained for end point CPg' in FIG. 10 is different from the set Sg obtained for timing node CPg in FIG. 9. This mismatch between the aggregate set of constraints for the end points between two circuit configurations obtained by traversing the timing paths from the start points can be flagged as a timing mismatch between the two circuit configurations. The aggregate sets of constraints for start points obtained by traversing in the reverse direction of the edges starting from the end points can also be compared to similarly identify the timing constraint mismatch between circuit configurations.

The set of timing nodes from where the traversal originates for aggregating timing constraints is referred to as a source set. The set of timing nodes where the traversal terminates for aggregating timing constraints is called a sink set. The direction of traversal is from the source set to the sink set. If the source set comprises start points and the sink set comprises end points, the direction of traversal is in the direction of the edges. If the source set comprises end points and the sink set comprises start points, the direction of traversal is against the direction of the edges.

In an embodiment, the timing constraints are aggregated by starting the traversal from a source set of timing nodes and ending the traversal at a sink set of timing nodes. The aggregate timing constraints associated with the sink set can be compared for two circuit configurations. Precedence rules can be applied to eliminate redundant constraints associated with timing nodes. Constraints associated with different timing nodes in the same sink set are not combined together but are treated separately. Aggregate timing constraints for two sink sets of timing nodes from two circuit configurations are compared by comparing the aggregate timing constraints for individual timing nodes in the sets. If the aggregate constraints obtained for a set of end points starting from a set of start points shows a mismatch, the end points can be flagged as a timing constraint mismatch. In one embodiment, aggregation of constraints comprises processing a set of constraints associated with a timing path to determine a normalized set of constraints that cannot be reduced further. For example, a set of constraints can be represented using a language that has multiple ways of representing the same constraint. As a result, a set of constraints can comprise multiple representations of the same constraint. The set of constraints associated with a timing path can be processed by replacing the different representations of the same constraint with a single representation of the constraint. The resulting representation of the constraint can be considered a normalized representation of the constraint. Comparison of two sets of constraints that are normalized ensures that there are no false mismatches found due to different representations of the same set of constraints.

A timing node of a source set can be called a source timing node and a timing node of a sink set can be called a sink timing node. The timing nodes of a source set can be all start points or all end points but not a mixture of both. Similarly timing nodes in a sink set can be all start points or all end points but not both. If the source set comprises start points, the sink set comprises end points. Similarly if the source set comprises end points, the sink set comprises start points.

The aggregation of the constraints for all the timing paths from a source timing node to a sink timing node allows interactions between constraints to be considered. For example, precedence rules can be applied to an aggregate set of constraints for a timing node to determine an effective set of constraint that is applicable to the timing node. For example, in FIG. 9, it may be determined that based on precedence rules, the constraint c5 overrides the constraint c6 and the set Sg is equivalent to {c1, c2, c4, c5} which is same as set Sg' in FIG. 10. In this case, even though the aggregate constraint set Sg shown in FIG. 9 is different from the aggregate constraint set Sg' shown in FIG. 10, the precedence rules determine that sets Sg and Sg' are equivalent. Accordingly, based on the precedence rules, the timing constraints shown in FIG. 9 and FIG. 10 do not have mismatch and there is no reason to flag the differences between Sg and Sg'.

On the other hand, it may be determined based on the precedence rules that the constraint c6 overrides the constraint c5 and the set Sg is equivalent to set {c1, c2, c4, c6} which is different from the set Sg' in FIG. 10. As a result, based on these precedence rules the sets Sg and Sg' are different and this timing constraint mismatch will be flagged.

Even if the aggregate timing constraints may match for corresponding end points, there may still be a mismatch for intermediate timing nodes encountered while traversing from a start point to the end point (or in the reverse direction). In one embodiment, if the timing constraints match for corresponding end points between two circuit configurations, further analysis is performed to identify if the aggregate constraint sets for the other timing nodes in the timing paths match or not. In one embodiment, if the timing constraints between two circuit configurations are determined to be matching for the corresponding end points a subset of nodes along the timing paths is further analyzed. For example, only the reconvergent/divergent nodes along the timing paths are analyzed.

Figure 11:
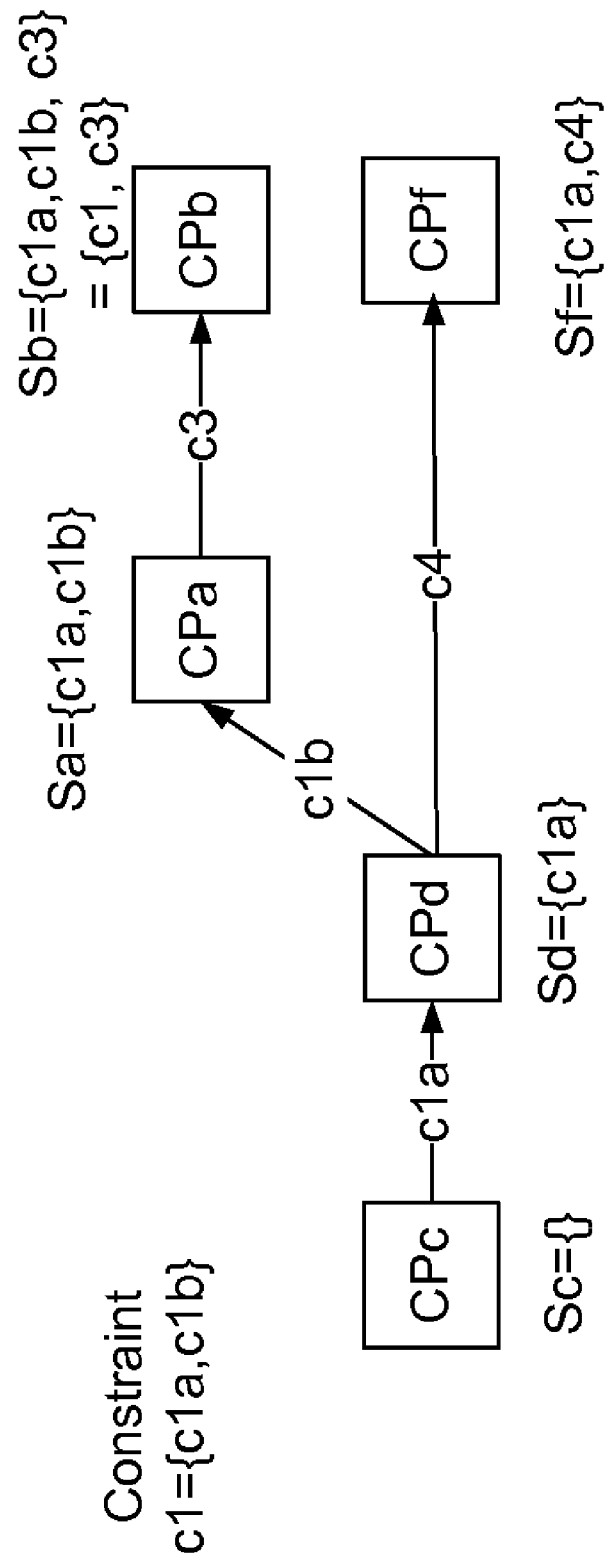
FIG. 11 illustrates constraints comprising sub-constraints that are associated with different edges.

Some constraints may be split into sub-constraints, each sub-constraint applicable to a different edge. These constraints are satisfied when all the sub-constraints are encountered along a timing path while traversing from a start point to the end point. If only a subset of sub-constraints is encountered along a timing path, the overall constraint is not satisfied. FIG. 11 illustrates a constraint c1 that is satisfied only if both sub-constraints $c1a$ and $c1b$ exist in the aggregate set of constraints at a timing node. For purposes of illustration, assume that the timing node CPc shown in FIG. 11 is a start point and the timing nodes CPb and CPf are end points. The timing path from CPc to CPb includes both $c1a$ and $c1b$ sub-constraints resulting in the set $Sb=\{c1a,c1b,c3\}=\{c1,c3\}$ associated with timing node CPb. As a result the timing path from CPc to CPb satisfies the constraint c1 since it includes both the sub constraints $c1a$ and $c1b$. However, the timing path from CPc to CPf includes only the sub-constraint $c1a$ but not the sub-constraint $c1b$, resulting in the set $Sf=\{c1a,c4\}$ associated with timing node CPf. As a result the timing constraint c1 is not satisfied for the timing path from CPc to CPf.

Comparing Circuit Configurations

Various embodiments can determine aggregate constraints for timing nodes between a source set and a sink set in different ways. For example, aggregate constraints of individual timing paths between a start point and end point can be determined separately and combined together. Alternatively, the aggregate constraints for different timing nodes can be determined by performing a graph traversal of the circuit from the source set to the sink set, while computing aggregate constraints of timing nodes encountered along the way. A graph traversal can be performed that can compute transitive closure of values associated with the edges of the graph. However, some graph traversal algorithms may perform more efficiently compared to other algorithms. For example, a depth first search based traversal is likely to process the same set of nodes multiple times and may be less efficient compared to a breadth first search for propagating timing constraints.

Figure 12:
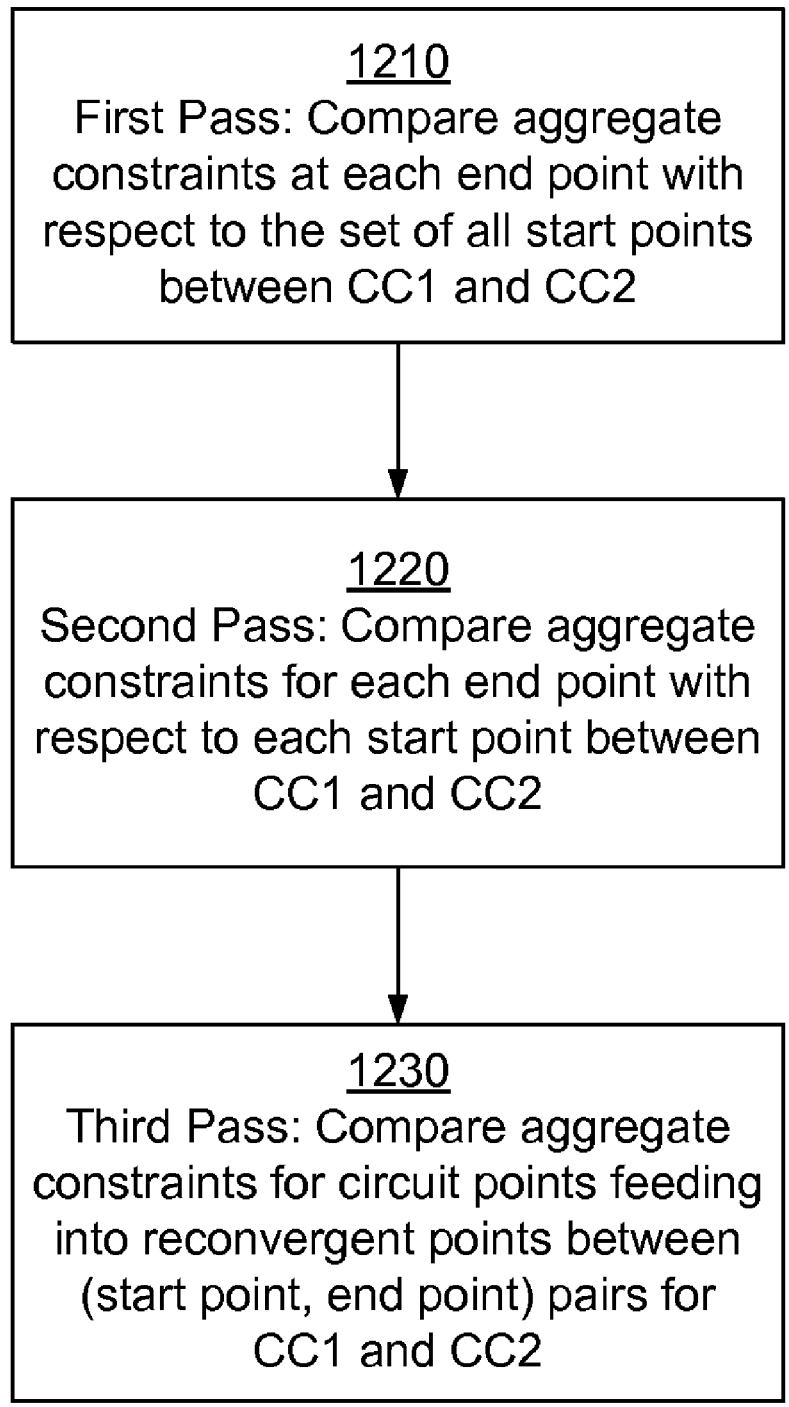
FIG. 12 is a flow diagram illustrating an overall process for detecting mismatched timing constraints in circuit configurations.

FIG. 12 shows an embodiment of the overall process for comparing timing constraints of two circuit configurations CC1 and CC2. The process involves three passes through the circuit, each pass identifying timing mismatches between the two circuit configurations. The first pass 1210 computes aggregate constraints for each end point starting from the complete set of start points. The aggregate constraints for the corresponding end points between the two circuit configurations are compared to identify mismatches. If a mismatch is detected for an end point, the end point is flagged as a mismatch. The set of end points that are not flagged as mismatches are further processed in the second pass 1220.

The second pass 1220 compares aggregate constraints obtained for each start point by traversing from each end point in the reverse direction of the edges. The corresponding (start point, end point) pairs for the two circuit configurations are compared to identify mismatches. If a (start point, end point) pair for the two circuit configurations shows a mismatch, the mismatch is flagged. The (start point, end point) pairs for the two circuit configurations that do not show any mismatch in the second pass are further processed in the third pass. The third pass 1230 compares aggregate constraints of timing nodes feeding into reconvergent points between a (start point, end point) pair. This process is continued until either mismatches are detected or the (start point, end point) pair is determined not to have any mismatches.

In one embodiment, the first pass 1210 and the second pass 1220 are implemented by a breadth first graph traversal of the circuit associated with the circuit configuration. In one embodiment, the breadth first algorithm starts with a set of timing nodes and treats it as the current set of timing nodes. At each step, all timing nodes that neighbor the current set are processed. A timing node neighbors a set of timing nodes if all incoming edges of the timing node originate at nodes within the set (and the timing node does not belong to the set). For example, if a timing node has three incoming edges and all three incoming edges are coming from nodes within the set, the timing node neighbors the set. However, if two of the incoming edges are coming from nodes within the set and one edge comes from a node outside the set, the timing node does not neighbor the set. The above description of a neighboring node is based on a graph being processed in the direction of the edges. If a graph is processed in the reverse direction of edges, a neighboring node of a set of timing nodes is defined as the timing node such that all outgoing edges from the timing node connect to a node within the set.

Processing a neighboring timing node comprises computing the aggregate constraints for the neighboring timing node based on the timing nodes in the current set. After the set of neighboring timing nodes is processed, the neighboring timing nodes are added to the current set and the above process repeated. The process is continued until all timing nodes are processed or until a desired timing node, say an end point is reached.

Figure 13A:
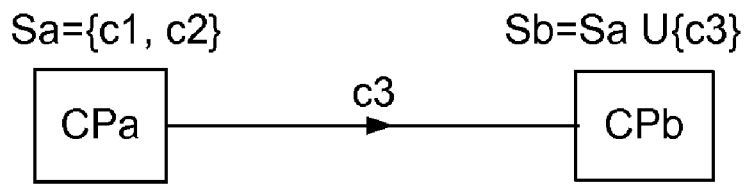
FIGS. 13(a)-(c) illustrate how constraints are propagated along circuit paths to compute aggregate constraints.
Figure 13B:
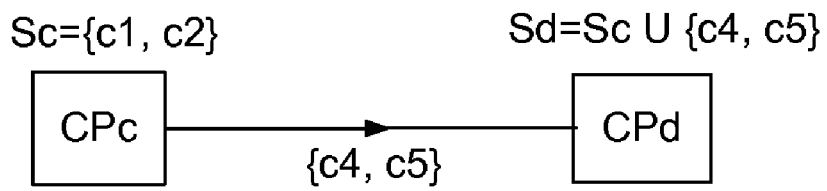

FIG. 13 illustrates how aggregate constraints of neighboring timing nodes are computed based on timing nodes in the current set. FIG. 13(a) shows an edge associated with constraint c3, connecting CPa with CPb. Assume CPa belongs to the current set and CPb is a neighboring timing node. The aggregate set of constraints Sb corresponding to CPb is obtained by adding the constraint c3 associated with the edge to the set Sa of constraints associated with CPa. FIG. 13(b) shows an edge connecting CPc with CPd that is associated with multiple constraints c4 and c5. Assume CPc belongs to the current set and CPd is a neighboring timing node. The aggregate set Sd of constraints for CPd is obtained by taking a union of the set Sc of constraints for CPc with the set of constraints associated with the edge, i.e., $\{c4,c5\}$.

Figure 13C:
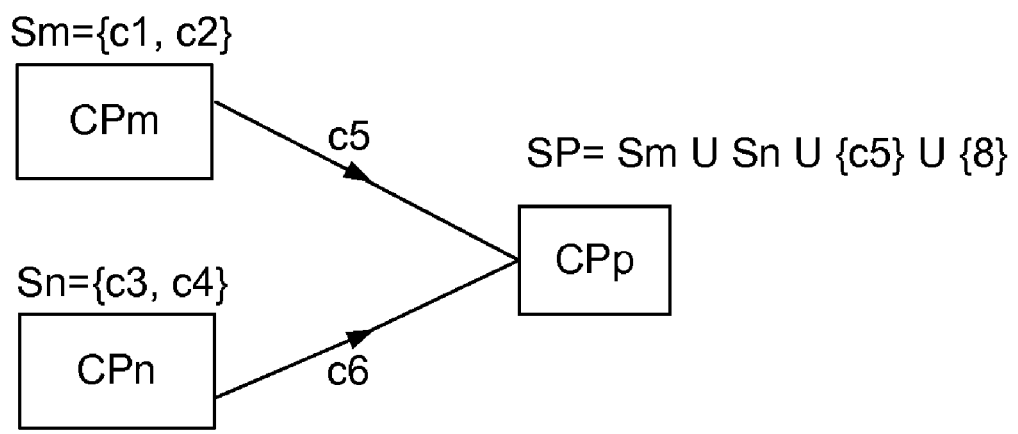

FIG. 13(c) shows two incoming edges of timing node CPp, one edge connecting CPm to CPp and the other edge connecting CPn to CPp. Assume, CPm and CPn belong to the current set and CPp is a neighboring timing node. Constraint c5 is associated with the edge from CPm to CPp and constraint c6 is associated with the edge from CPn to CPp. The set of constraints Sp of the timing node CPp is obtained by taking the union of the constraints belonging to the sets Sm and Sn of the timing nodes CPm and CPn respectively along with the constraints c5 and c6 associated with the incoming edges.

FIG. 14 illustrates the first pass 1210 shown in FIG. 12, using this particular approach. The various steps shown in FIG. 14 illustrate the computation of the aggregate constraints for the circuits starting from an initial set of timing nodes 1410. The timing nodes CP1 and CP2 are considered the start points for the circuit shown in FIG. 14 since they have no incoming edges. The timing nodes CP9 and CP10 are the end points of the circuit shown in FIG. 14 since they have no outgoing edges. The sets of constraints for CP1 and CP2 as shown in FIG. 14(a) are empty since there are no incoming edges to the timing nodes CP1 and CP2. In some embodiments, the start points may be initialized with a set of constraints.

Figure 14A:
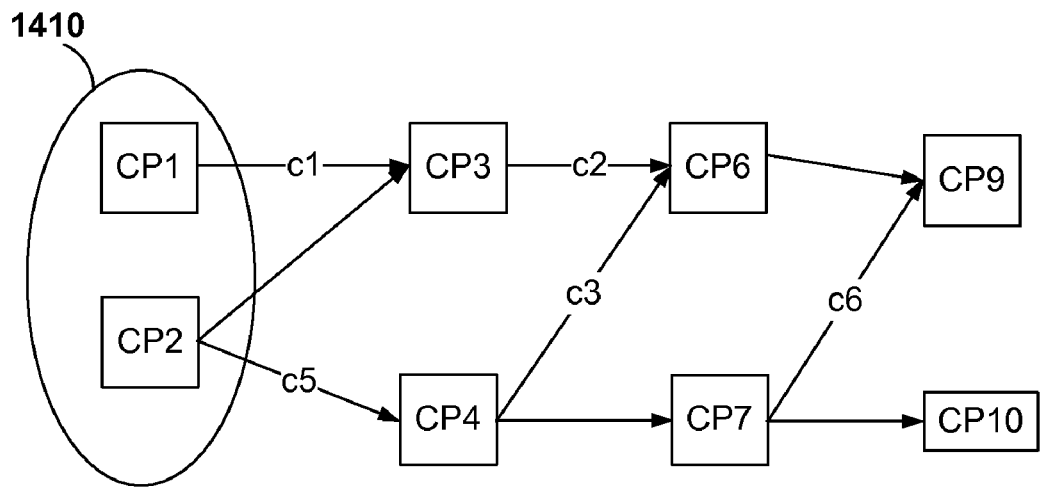
FIGS. 14(a)-(d) illustrate the steps of computation of aggregate constraints at an end point of the circuit with respect to a set of start points.
Figure 14B:
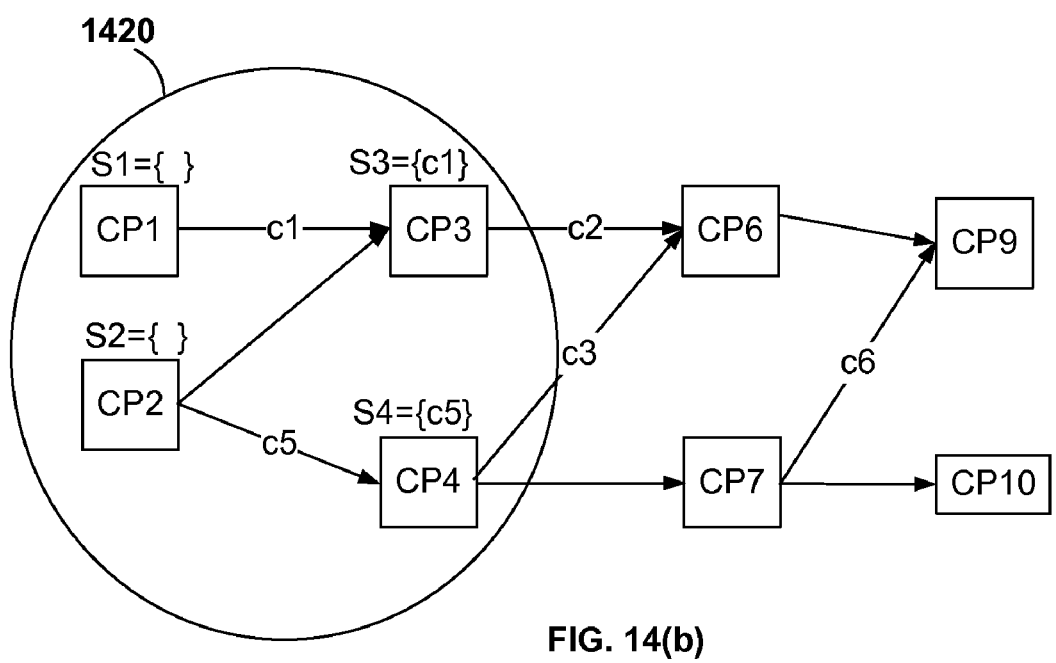

The set of neighboring timing nodes of set 1410, includes CP3 and CP4. The aggregate sets of constraints for CP3 and CP4 are determined as shown in FIG. 14(b). The timing node CP4 has a single incoming edge associated with constraint c5, resulting in the set of constraints S4={c5}. The timing node CP3 is a reconvergent point with two incoming edges from timing nodes CP1 and P2. The edge from CP2 to CP3 is not associated with any constraint. Therefore the set of constraints for timing node CP3 is S3={c1}. The timing nodes CP3 and CP4 are added to the set 1410 resulting in the set 1420 as the current set of timing nodes.

Figure 14C:
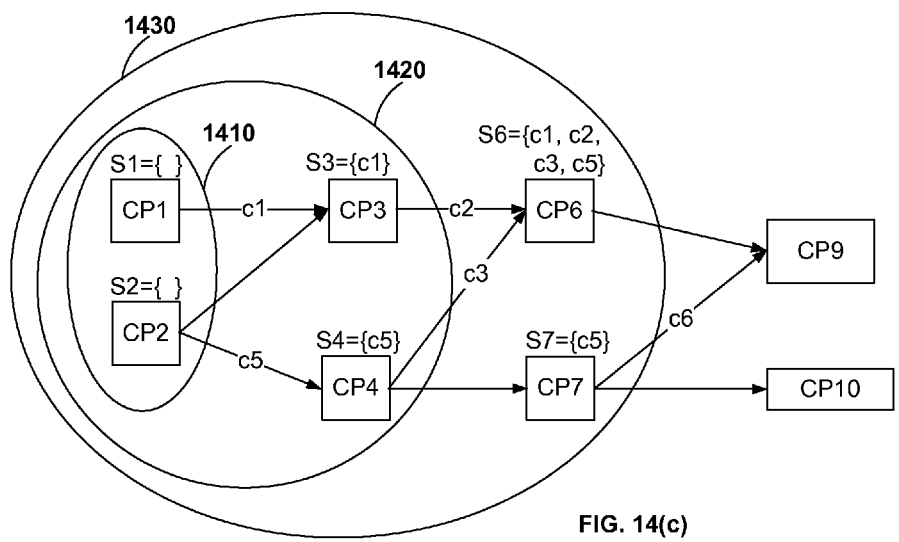
Figure 14D:
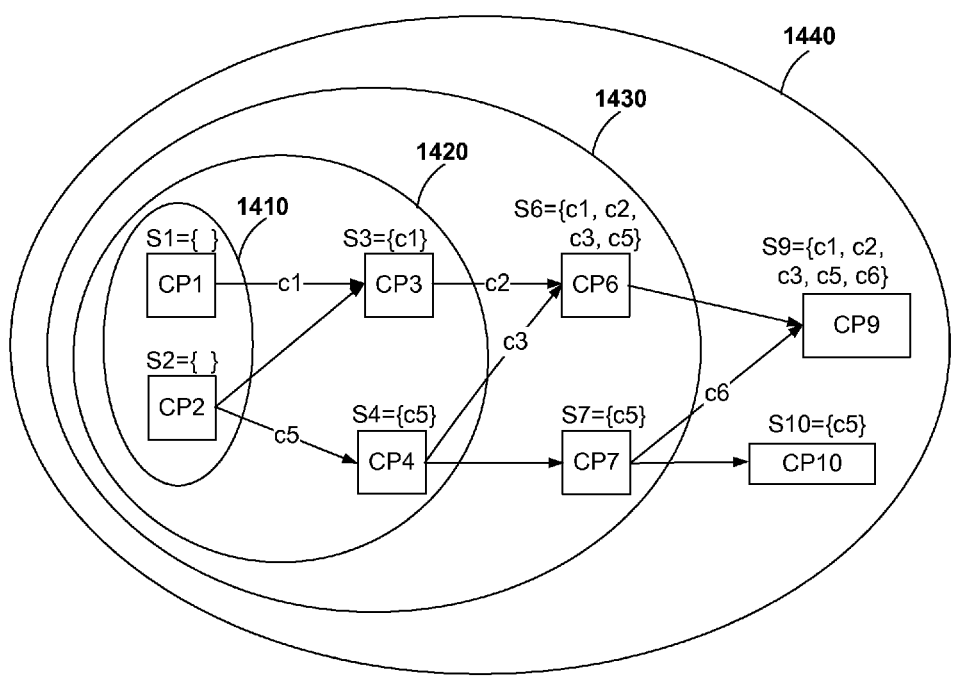
Figure 15A:
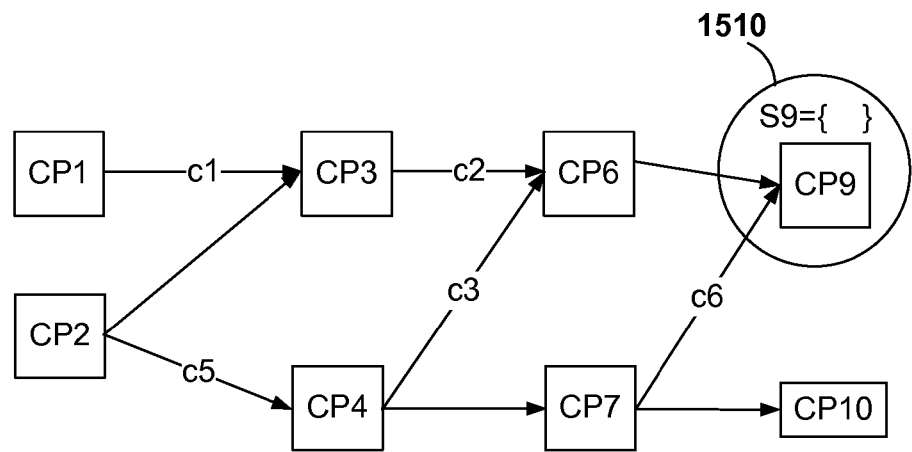
FIGS. 15(a)-(d) illustrate the steps of computation of aggregate constraints at a start point of the circuit with respect to an end point of the circuit.
Figure 15B:
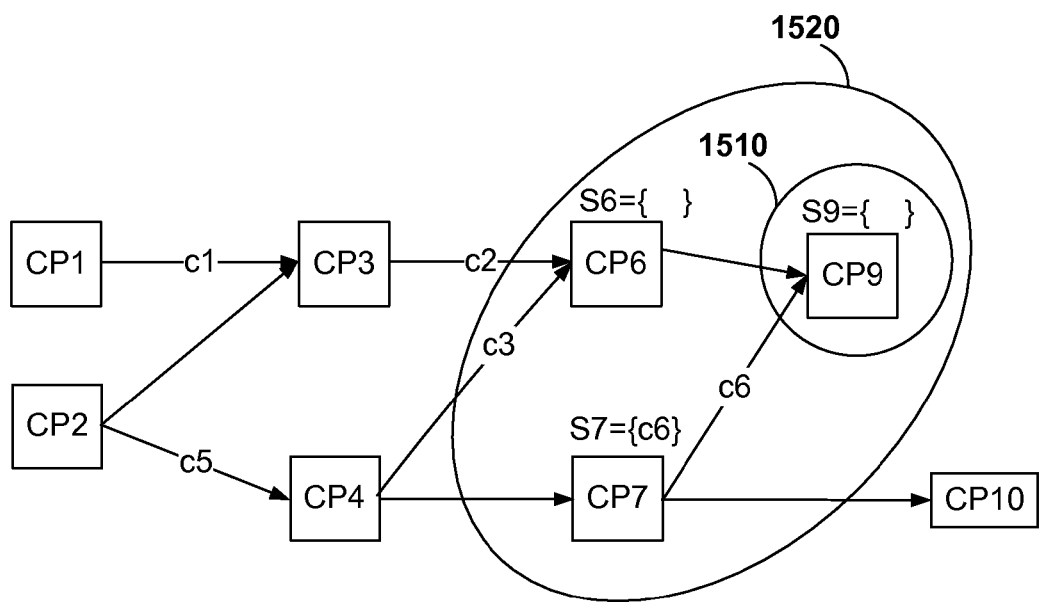
Figure 15C:
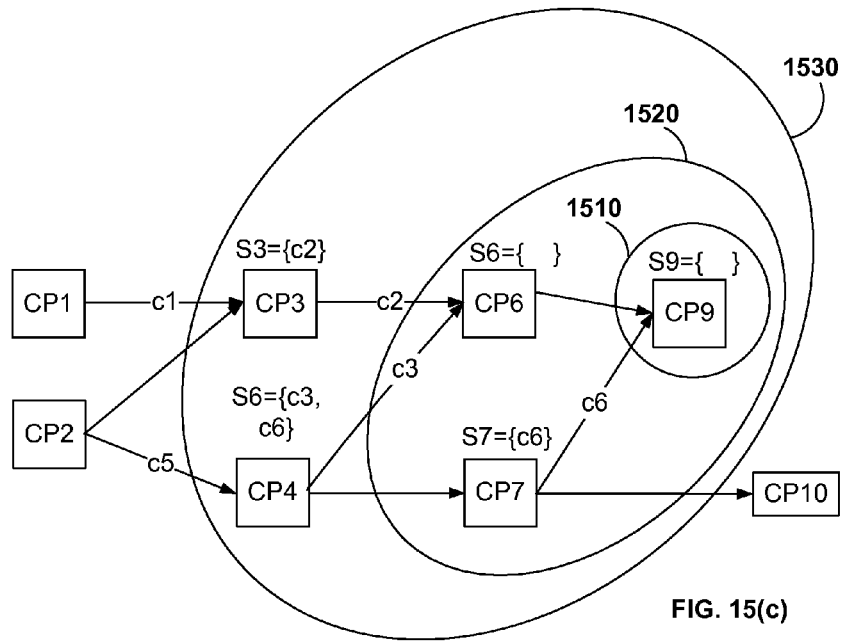
Figure 15D:
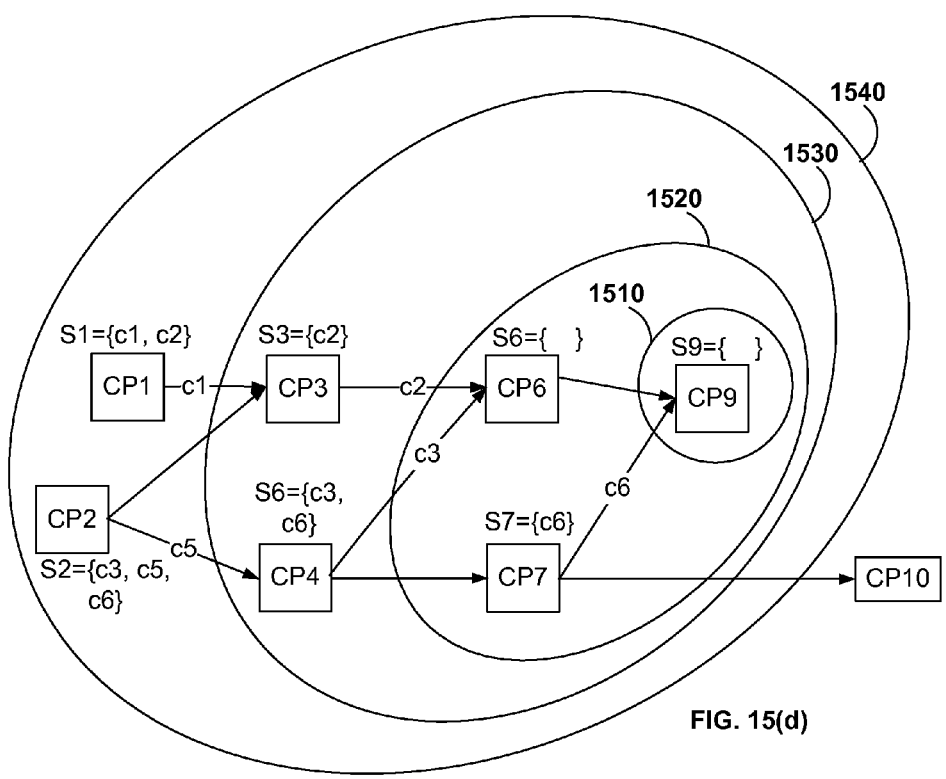

As illustrated in FIG. 14(c) the neighboring timing nodes of the set 1420 are CP6 and CP7. Next the aggregate sets of constraints for CP6 and CP7 are determined. The aggregate set S6 of constraints for the reconvergent point CP6, includes the constraints in set S3, set S4, and the constraints c2 and c3 associated with the incoming edges of CP6 resulting in S6={c12,c2,c3,c5}. The aggregate set of constraints S7 associated with CP7 is determined to be same as S4 since no constraints are added by the edge between CP4 and CP7. The timing nodes CP6 and CP7 are added to the set 1420 to obtain set 1430. Similarly, as illustrated in FIG. 14(d), the remaining timing nodes are processed. The timing nodes CP9 and CP10 are the end points of the circuit.

The process illustrated by FIG. 14 determines the aggregate sets of constraints for the end points of a circuit starting from the set of all start points of the circuit. The process also computes the aggregate sets of constraints for timing nodes encountered along the timing paths from the set of start points to each end point, for example, timing nodes CP3, CP4, CP6, and CP7. The aggregate set of constraints for a particular timing node corresponds to an aggregate of all the constraints associated with the timing paths between the set of all start points and each end point.

FIG. 15 illustrates the steps of the second pass 1220 shown in FIG. 12. The computation in the second pass is similar to the first pass except that the source set of timing nodes is a particular end point, the sink set is a particular start point and the direction of traversal is in the reverse direction of the edges. As shown in FIG. 15(a), the source set of timing nodes includes a single end point CP9. As shown in FIG. 15(b), the neighboring timing nodes of the set 1510 include CP6 and CP7, traversing in the reverse direction of the edges. The aggregate sets of constraints for CP6 is S6={}, i.e., empty set since the edge between CP6 and CP9 is not associated with any constraint. The edge between CP7 and CP10 is not associated with any constraint but the edge between CP7 and CP9 is associated with a constraint c6, resulting in S7={c6} being added to S7. The timing nodes CP6 and CP7 are added to the set of timing nodes 1510 to obtain set 1520. The above process is continued as shown in FIG. 15(c) to determine aggregate sets of constraints for timing nodes CP3 and CP4 since they are neighboring timing nodes for the set 1520. The timing node CP4 is a divergent point. The timing nodes CP3 and CP4 are added to the set 1520 to obtain set 1530. The aggregate sets of constraints for the remaining timing nodes can be determined similar to the examples presented above. The final step illustrated in FIG. 15(d) determines the aggregate sets of constraints for each start point with respect to the end point CP9. The process is repeated for each end point, for example CP10.

Figure 16:
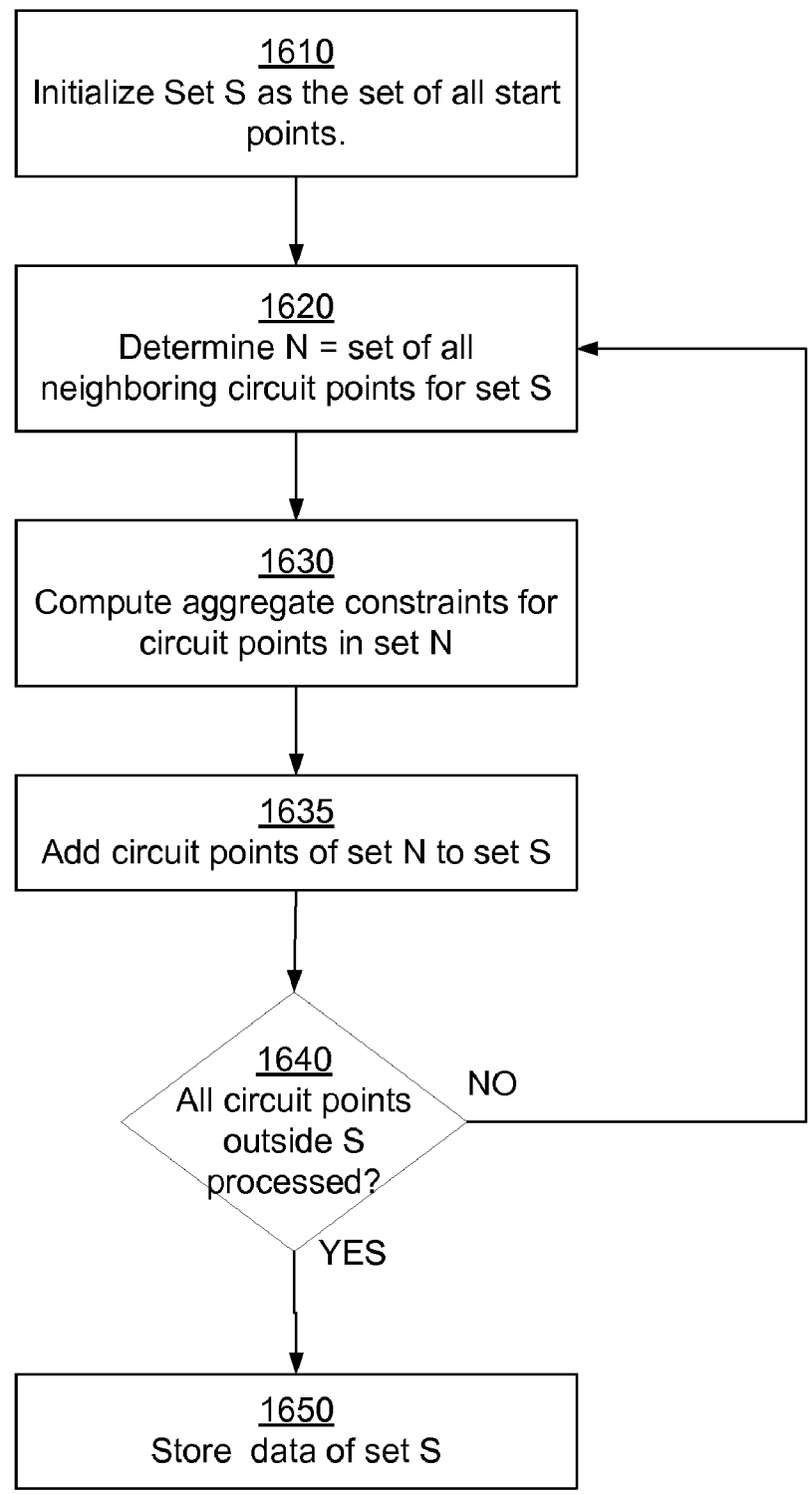
FIG. 16 is a flow chart illustrating the steps for determining the aggregate constraints for a set of end points with respect to a set of start points.

The details of the steps used in the various passes shown in FIG. 12 are further described as flowcharts. FIG. 16 shows a flow chart illustrating the steps for determining the aggregate constraints for a set of end points with respect to a set of start points. The set S of timing nodes is initialized 1610 as the set of all start points. The set N of all neighboring timing nodes of the timing nodes in set S is determined 1620. The aggregate constraints for the timing nodes in the set N are computed 1630. The timing nodes of set N are added 1635 to the set S. If it is determined 1640 that all timing nodes outside set S are processed, the processing stops by storing the data of the set S. Otherwise, the above steps 1620, 1630, 1635, and 1640 are repeated. The computation of the second pass 1220 is also illustrated by the flowchart shown in FIG. 16, where the set S is initialized to an individual end point and the edges are traversed in the reverse direction to determine the neighboring timing nodes with respect to set S.

Figure 17:
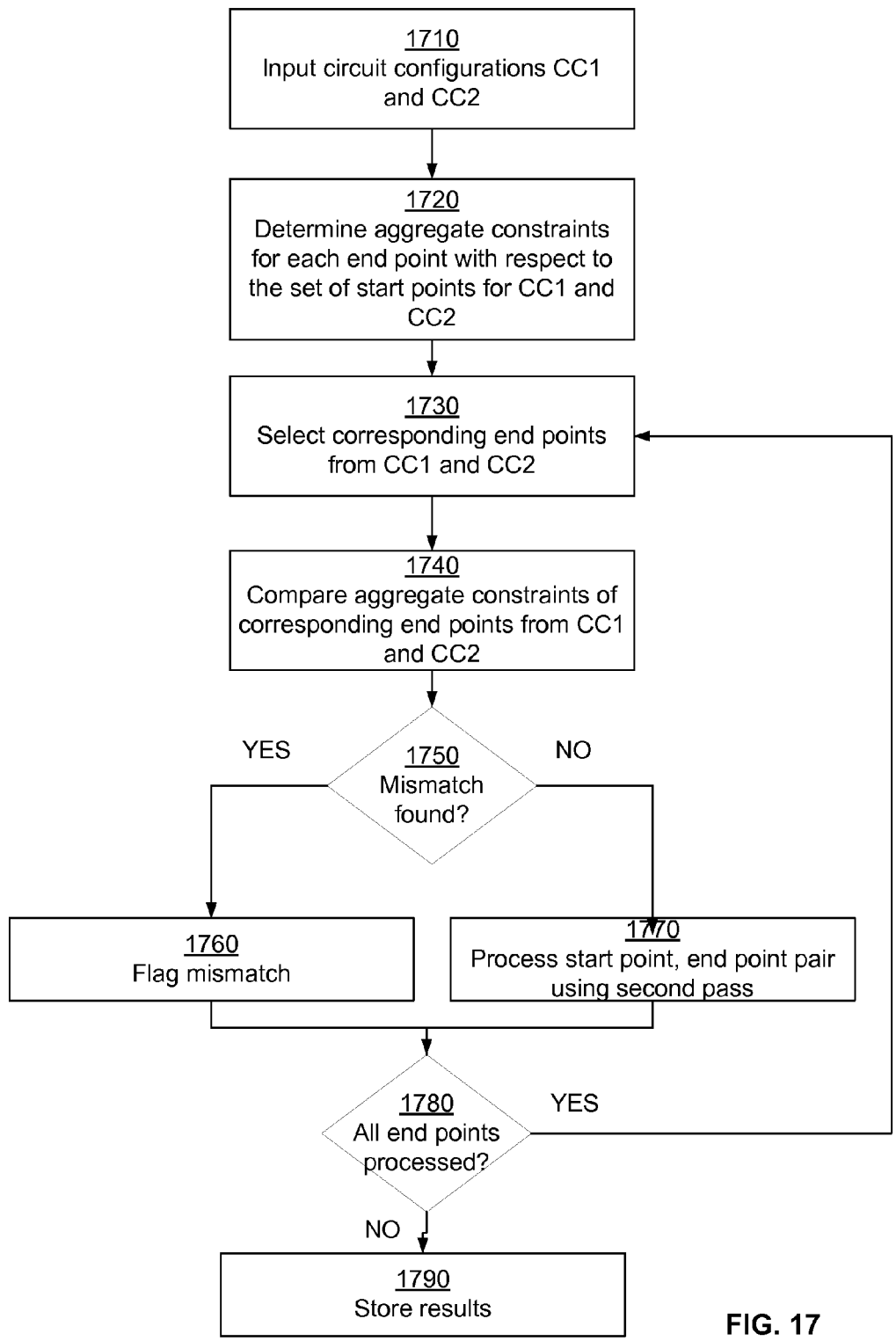
FIG. 17 is a flow chart illustrating the steps for comparing timing constraints of two circuit configuration based on the first pass in FIG. 12.

FIG. 17 shows how the process shown in FIG. 16 is used for comparing timing constraints of two circuit configurations. The two circuit configurations CC1 and CC2 that are being compared are read S10. In some embodiments, the circuit configurations are made available as input files stored on the disk. The aggregate constraints for each end point with respect to the complete set of start points is determined 1720 as described by the steps in FIG. 16. The results obtained for the two circuit configurations are compared to determine if there are mismatches. An end point is selected 1730 from CC1 and the corresponding end point is selected 1730 from CC2. The aggregate constraints of the corresponding end points from CC1 and CC2 are compared 1740. If a mismatch is found 1750, the mismatch is flagged 1760. Two sets of constraints can be determined to have a mismatch if the constraints in one set are all different from the constraints of the other set. If the two sets are singleton sets and the corresponding elements match, the two sets are determined to match. If no mismatch is found between the two end points, the end-point is further processed 1770 using the second pass. If a subset of the set of constraints matches but the remaining elements show a mismatch, the second pass can be used to further analyze the subset that matches. If all end points are processed 1780, the results may be stored and the process stops. Otherwise, the next pair of end points is selected 1730 from CC1 and CC2 and the process above repeated.

Figure 18:
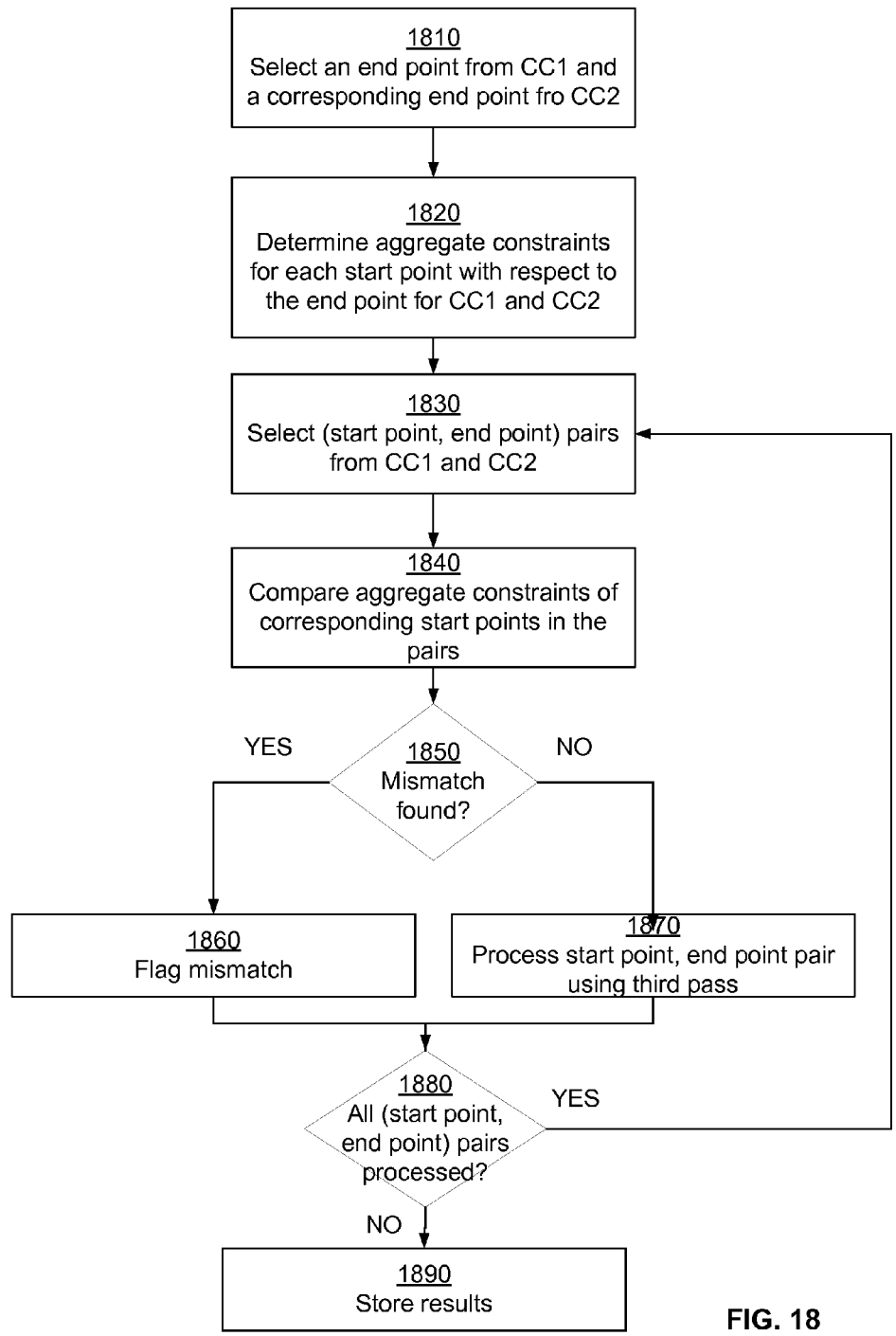
FIG. 18 shows a flow chart illustrating the steps of the second pass in FIG. 12 for matching (start point, end point) pairs.

FIG. 18 shows a flow chart illustrating the steps of the second pass 1220 for matching (start point, end point) pairs according to an embodiment. An end point is selected 1810 from the circuit configuration CC1 and the corresponding end point selected 1810 from circuit configuration CC2. As described above, the second pass is executed if the aggregate constraints for the corresponding end points from the circuit configurations match. The aggregate constraints are determined for each start point with respect to the end point for each circuit configuration by following the process described in FIG. 16 from the end point and traversing the edges in the reverse direction. A (start point, end point) pair is selected 1830 from each circuit configuration such that there is at least one timing path between the start point and the end point. The aggregate constraints of the corresponding start points from the two circuit configurations are compared 1840. If a mismatch is found 1850, the mismatch is flagged 1860. Otherwise, the (start point, end point) pairs from the two circuit configurations are processed 1870 using the third pass 1230. If all (start point, end point) pairs are determined 1880 to be processed, the results are stored 1890 and the process stops. Else the next (start point, end point) pair is selected 1830 and the above steps repeated.

Figure 19:
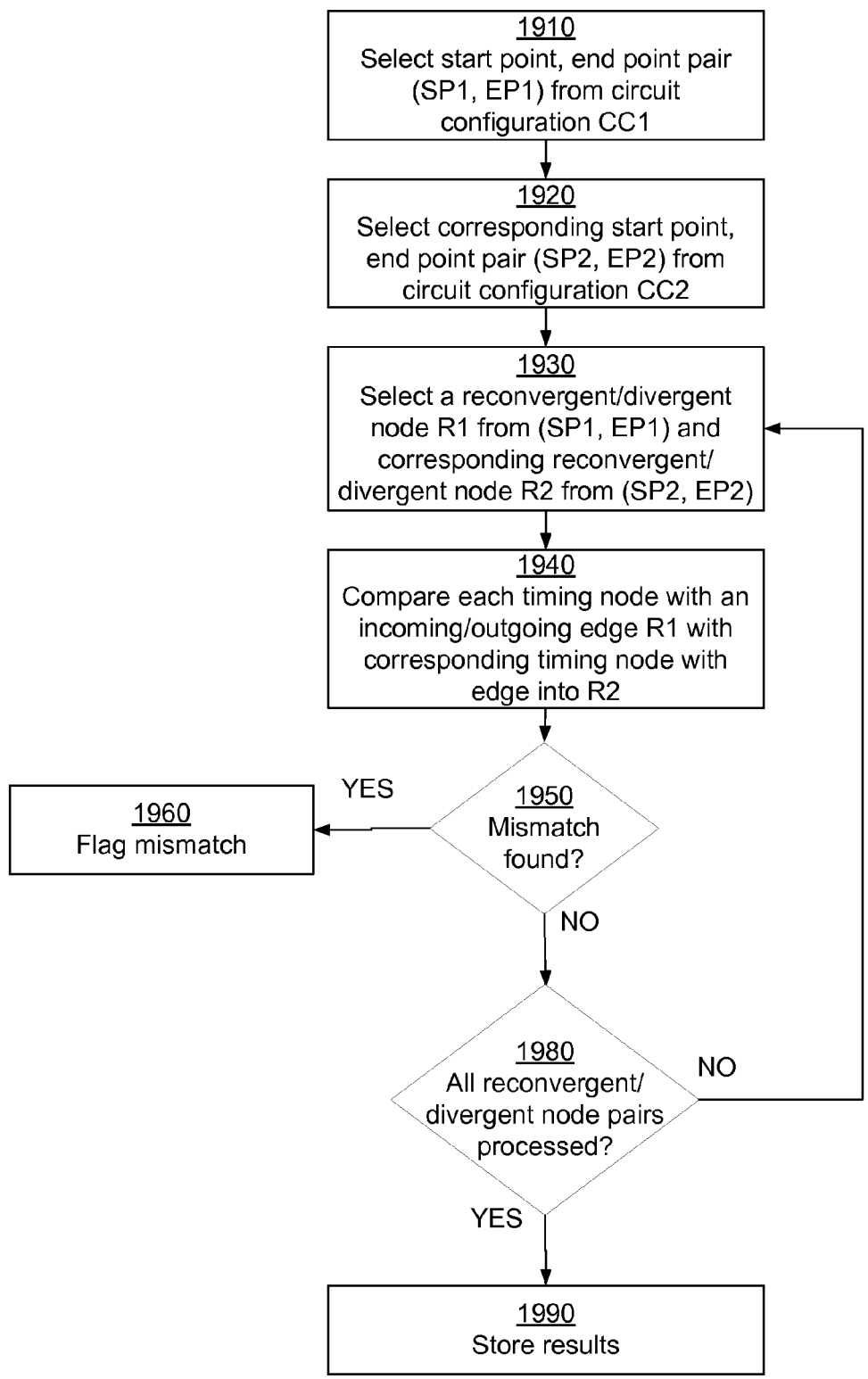
FIG. 19 is a flow chart illustrating the steps of the third pass in FIG. 12 for comparing reconvergent points of two circuit configurations.

FIG. 19 shows a flow chart illustrating the steps for comparing reconvergent/divergent points of two circuit configurations according to an embodiment. The following description applies to reconvergent points but can be extended to divergent points. A (start point, end point) pair (SP1, EP1) is selected 1910 from circuit configuration CC1 and a corresponding (start point, end point) pair (SP2, EP2) is selected 1920 from circuit configuration CC2 such that the aggregate constraints of SP1 and SP2 match as determined by the second pass 1220. A reconvergent point MP1 that is encountered while traversing from SP1 to EP1 is selected 1930 from the pair (SP1, EP1) and a corresponding reconvergent point MP2 that is encountered while traversing from SP2 to EP2 is selected 1930 from the pair (SP2, EP2). The timing nodes that feed edges into MP1 and MP2 are compared 1940 (i.e., a timing node feeds an edge into a reconvergent point if an edge connects the timing node to the reconvergent point). If MP1 and MP2 are divergent points, the timing nodes connected to MP1, MP2 via outgoing edges are matched 1940.

If a mismatch is found 1950, the mismatch is flagged 1960. If the reconvergent points are found to match, the remaining circuit paths associated with the (start point, end point) pairs are checked to see if all reconvergent points are processed 1980. If all reconvergent points are determined 1980 to be processed, the processing of the (start point, end point) pair is completed, and the results can be stored 1990. Otherwise, the next unprocessed reconvergent point is selected 1930 and processed as described above.

Figure 20:
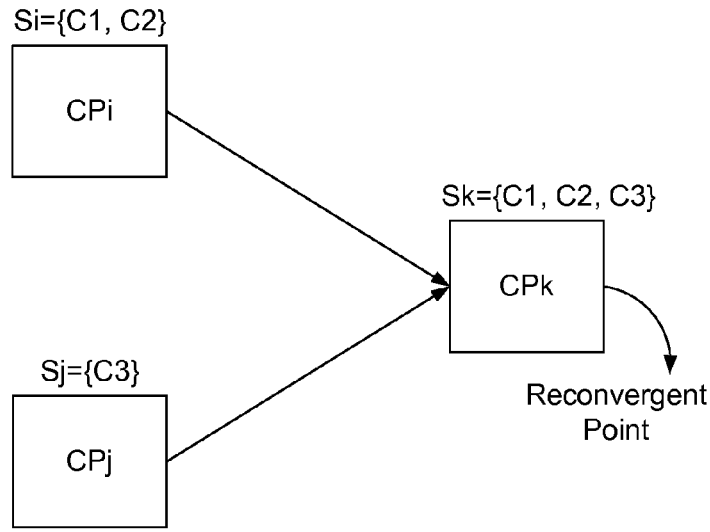
FIG. 20 illustrates the comparison of a reconvergent point in two circuit configurations.
Figure 20:
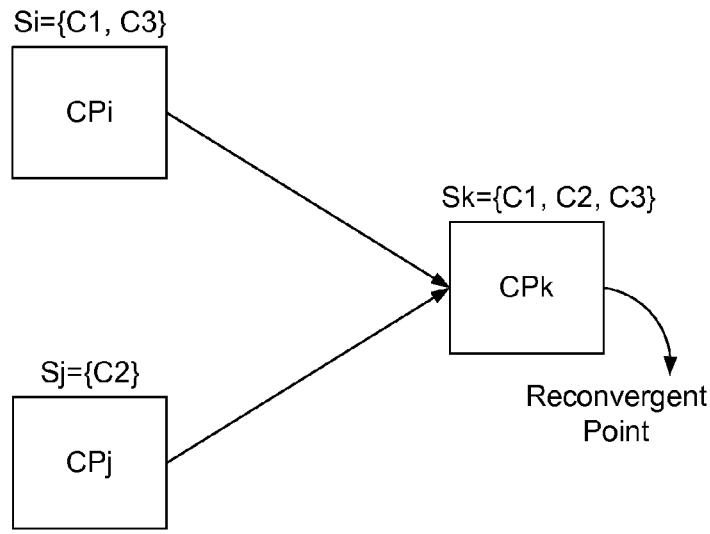

FIG. 20 illustrates how reconvergent points from two different circuit configurations are compared. As shown in FIG. 20, CPk is a reconvergent point in CC1 and CPk' is the corresponding reconvergent point in CC2. The aggregate sets of constraints for the reconvergent points shown as Sk and Sk' have the same elements {c1, c2, c3}. However, if the timing nodes with edges incoming to the reconvergent points are compared, a mismatch can be detected. If CPi in CC1 corresponds to CPi' in CC2, the corresponding aggregate sets of constraints are different, i.e., Si={c1,c2} and Si'={c1,c3}. Similarly the aggregate sets of constraints for the timing nodes CPj and CPj' are different, i.e., Sj={c3} and Sj'={c2}. Hence a mismatch can be flagged corresponding to the timing nodes feeding into the reconvergent points. The analysis illustrated by FIG. 20 can be applied to a divergent point if the timing paths are traversed in the reverse direction of the edges. Accordingly, timing nodes connected by edges that are out going from the divergent point are compared to identify mismatches.

The above processes perform comparison of timing nodes based on aggregate sets of constraints associated with timing nodes determined by traversing from one or more source timing nodes to a target timing node. The computation of aggregate sets of constraints associated with timing nodes allows processing of the sets of constraints based on precedence rules or other criteria in order to obtain a normalized set of constraints. Obtaining a normalized set of constraints simplifies the process of matching corresponding timing nodes from two circuit configurations and also reduces the possibility of false positives. As a result the disclosed timing constraint comparison provides improved results over existing approaches, for example, iterative pairwise comparison of constraints for the two circuit configuration. For example, false timing constraint mismatches that may be reported by iterative pairwise comparison of constraints as described in FIG. 4 are not reported by the disclosed techniques. Besides, timing constraint mismatches that exist in the circuits due to interaction between constraints but are not reported by iterative pairwise comparison of constraints as described in FIG. 3 are reported by the disclosed techniques.

Computer Architecture

Figure 21:
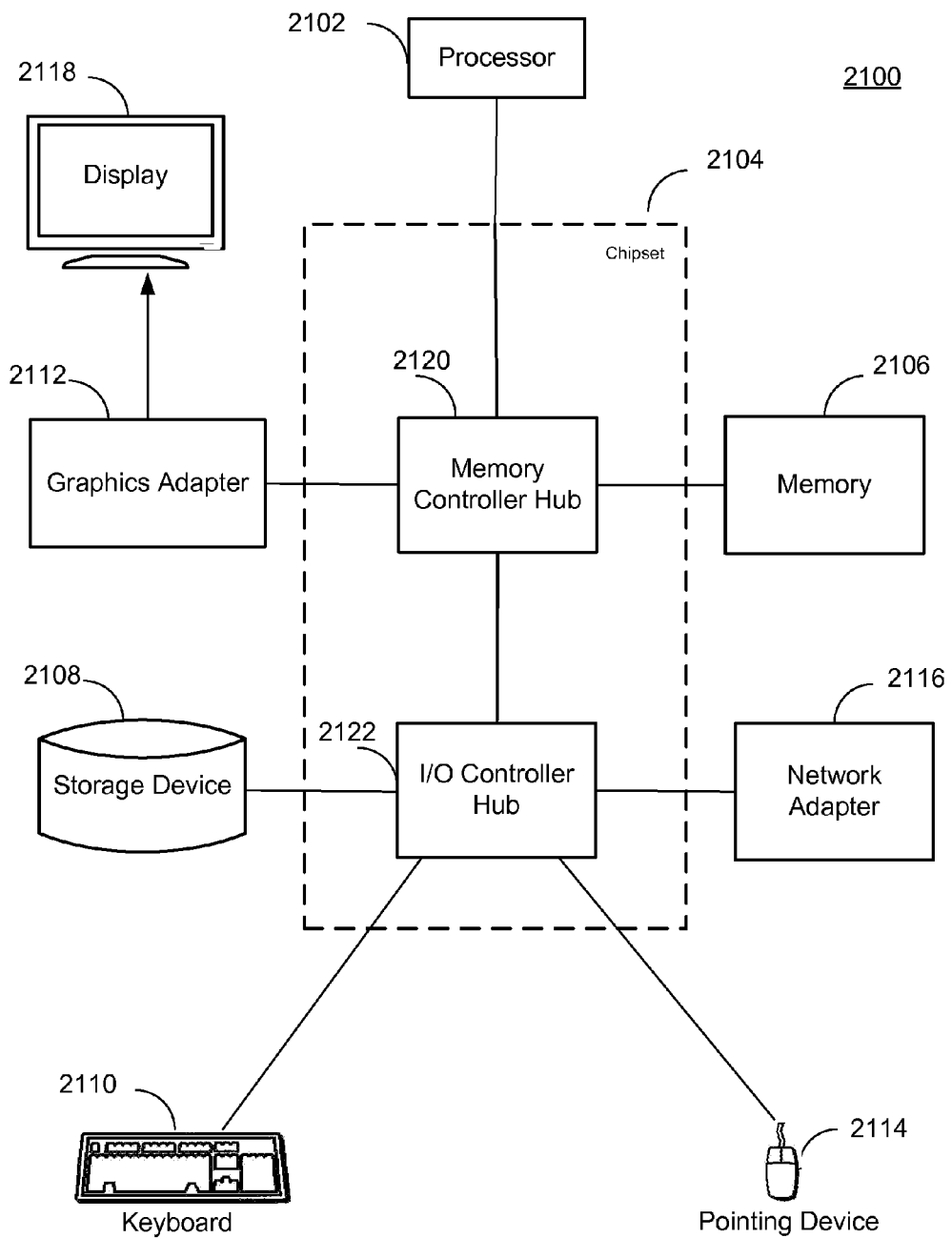
FIG. 21 is a high-level block diagram illustrating an example of a computer for use in comparison of timing constraints of two circuit configurations.

FIG. 21 is a high-level block diagram illustrating an example computer 2100 that can be used for processing the steps of the processes described herein. The computer 2100 includes at least one processor 2102 coupled to a chipset 2104. The chipset 2104 includes a memory controller hub 2120 and an input/output (I/O) controller hub 2122. A memory 2106 and a graphics adapter 2112 are coupled to the memory controller hub 2120, and a display 2118 is coupled to the graphics adapter 2112. A storage device 2108, keyboard 2110, pointing device 2114, and network adapter 2116 are coupled to the I/O controller hub 2122. Other embodiments of the computer 2100 have different architectures.

The storage device 2108 is a non-transitory computer-readable storage medium such as a hard drive, compact disk read-only memory (CD-ROM), DVD, or a solid-state memory device. The memory 2106 holds instructions and data used by the processor 2102. The pointing device 2114 is a mouse, track ball, or other type of pointing device, and is used in combination with the keyboard 2110 to input data into the computer system 2100. The graphics adapter 2112 displays images and other information on the display 2118. The network adapter 2116 couples the computer system 2100 to one or more computer networks.

The computer 2100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 2108, loaded into the memory 2106, and executed by the processor 2102. The types of computers 2100 used can vary depending upon the embodiment and requirements. For example, a computer may lack displays, keyboards, and/or other devices shown in FIG. 21.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for comparing timing constraints of circuits. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for comparing circuit configurations, the method comprising:
   receiving, by a computer, a first circuit configuration and a second circuit configuration; the first circuit configuration comprising a first set of timing nodes, first edges connecting the first set of timing nodes, and first timing constraints applicable to said first circuit configuration; the second circuit configuration comprising a second set of timing nodes, second edges connecting the second set of timing nodes, and second timing constraints applicable to said second circuit configuration; wherein timing nodes from the first circuit configuration are mapped to timing nodes from the second circuit configuration;
   identifying, by the computer, a first source set of at least one timing node in the first circuit configuration and a first sink set of at least one timing node in the first circuit configuration;
   identifying, by the computer, a second source set of at least one timing node in the second circuit configuration and a second sink set of at least one timing node in the second circuit configuration, the second source set corresponding to the first source set and the second sink set corresponding to the first sink set, the correspondence based on the mapping of timing nodes between the first circuit configuration and the second circuit configuration;
   determining, by the computer, a first set of timing constraints, comprising aggregating first timing constraints encountered in a traversal of timing paths from the first source set to the first sink set;
   determining, by the computer, a second set of timing constraints, comprising aggregating second timing constraints encountered in a traversal of timing paths from the second source set to the second sink set;
   determining, by the computer, whether the first set of timing constraints is equivalent to the second set of timing constraints; and
   responsive to determining that the first and second sets of timing constraints are not equivalent, indicating, by the computer, a mismatch between the first circuit configuration and the second circuit configuration.

2. The computer-implemented method of claim 1, wherein:
   the first sink set consists of a single end point; and
   the first source set consists of all start points with at least a timing path from the source timing node to the single end point.

3. The computer-implemented method of claim 1, wherein:
   the first source set consists of a single end point; and
   the first sink set consists of a single start point, the start point having a timing path to the single end point.

4. The computer-implemented method of claim 3, further comprising, responsive to determining that the first and second sets of timing constraints are equivalent:
   identifying a first reconvergent point on at least two timing paths between the first source set and the first sink set, and identifying a corresponding second reconvergent point on at least two timing paths between the second source set and the second sink set;
   identifying a first timing node connected by a first edge to the first reconvergent point, and identifying a corresponding second timing node connected by a second edge to the second reconvergent point;
   determining a third set of timing constraints, comprising aggregating timing constraints encountered in a traversal of timing paths from the first source set to the first timing node;
   determining a fourth set of timing constraints, comprising aggregating timing constraints encountered in a traversal of timing paths from the second source set to the second timing node;
   determining whether the third set of timing constraints is equivalent to the fourth set of timing constraints; and
   responsive to determining that the third and fourth sets of timing constraints are not equivalent, indicating a mismatch between the first circuit configuration and the second circuit configuration.

5. The computer-implemented method of claim 1, wherein aggregating first timing constraints encountered in a traversal of timing paths from the first source set to the first sink set comprises:
   identifying edges connecting a first timing node to a second timing node on timing paths from the first source set to the first sink set; and
   for the second timing node, determining an aggregate set of constraints associated with the second timing node as a union of a set of timing constraints associated with the first timing node and a set of timing constraints associated with the edge.

6. The computer-implemented method of claim 1, wherein aggregating first timing constraints encountered in a traversal of timing paths from the first source set to the first sink set comprises:
   identifying first timing nodes connected by first edges to reconvergent points and second timing nodes connected by second edges to reconvergent points; and
   for the reconvergent points, determining an aggregate set of constraints associated with the reconvergent point as a union of a set of timing constraints associated with the first timing node, a set of timing constraints associated with the second timing node, a set of timing constraints associated with the first edge, and a set of timing constraints associated with the second edge.

7. The computer-implemented method of claim 1, wherein determining a first set of timing constraints comprises eliminating a first timing constraint from the first set if a second timing constraint is determined to override the first timing constraint based on precedence rules.

8. The computer-implemented method of claim 1, wherein aggregating first timing constraints encountered in a traversal of timing paths from the first source set to the first sink set comprises:
- determining a set of timing constraints for a set of timing nodes consisting of the first source set;
- expanding the set of timing nodes to include neighboring timing nodes, and updating the set of timing constraints by aggregating timing constraints associated with expanding the set of timing nodes;
- repeating the previous step until the set of timing nodes includes the first sink set.

9. The computer-implemented method of claim 1, wherein the traversal of timing paths from the first source set is a breadth first traversal.

10. The computer-implemented method of claim 1, wherein the first source set consists of at least one start point and the first sink set consists of at least one end point.

11. The computer-implemented method of claim 1, wherein the first source set consists of at least one end point and the first sink set consists of at least one start point.

12. The computer-implemented method of claim 1, wherein the first set of timing nodes and edges connecting the first set of timing nodes are same as the second set of timing nodes and edges connecting the second set of timing nodes.

13. A computer-implemented method for comparing circuit configurations, the method comprising:
- receiving, by a computer, a first circuit configuration and a second circuit configuration; the first circuit configuration comprising a first set of timing nodes, first edges connecting the first set of timing nodes, and first timing constraints applicable to said first circuit configuration; the second circuit configuration comprising a second set of timing nodes, second edges connecting the second set of timing nodes, and second timing constraints applicable to said second circuit configuration; wherein timing nodes from the first circuit configuration are mapped to timing nodes from the second circuit configuration;
- identifying, by a computer, a first source set of at least one timing node and a first sink set of at least one timing node in the first circuit configuration;
- identifying, by the computer, a second source set of at least one timing node and a second sink set of at least one timing node in the second circuit configuration, the second source set corresponding to the first source set and the second sink set corresponding to the first sink set, the correspondence based on the mapping of timing nodes;
- determining, by the computer, a first aggregate set of timing constraints for timing paths from the first source set to the first sink set, comprising accounting for interactions between timing constraints;
- determining, by the computer, a second aggregate set of timing constraints for timing paths from the second source set to the second sink set; and
- determining, by the computer, whether the first aggregate set of timing constraints is equivalent to the second aggregate set of timing constraints.

14. The computer-implemented method of claim 13, wherein accounting for interactions between timing constraints from different timing paths comprises identifying dominant timing constraints satisfied on the timing paths based on precedence rules.

15. The computer-implemented method of claim 13, wherein accounting for interactions between timing constraints for timing paths comprises resolving redundancies in timing constraints.

16. A computer-implemented method for comparing circuit configurations, the method comprising:
- receiving, by a computer, a first circuit configuration and a second circuit configuration; the first circuit configuration comprising a first set of timing nodes, first edges connecting the first set of timing nodes, and first timing constraints applicable to said first circuit configuration; the second circuit configuration comprising a second set of timing nodes, second edges connecting the second set of timing nodes, and second timing constraints applicable to said second circuit configuration; wherein timing nodes from the first circuit configuration are mapped to timing nodes from the second circuit configuration;
- identifying, by the computer, first source timing nodes and first sink timing nodes for the first circuit configuration, and identifying corresponding second source timing nodes and second sink timing nodes for the second circuit configuration, the correspondence based on the mapping of timing nodes;
- performing, by the computer, a first pass comprising, for each first sink timing node:
  - determining a first aggregate set of timing constraints for timing paths from the first source timing nodes to the first sink timing node;
  - determining a second aggregate set of timing constraints for timing paths from the second source timing nodes to the corresponding second sink timing node;
  - determining whether the first set of timing constraints is equivalent to the second set of timing constraints;
  - responsive to determining that the first and second sets of timing constraints are not equivalent, indicating a mismatch between the first circuit configuration and the second circuit configuration; and
- for each first sink timing node where the first and second sets of timing constraints are determined to be equivalent, performing a second pass comprising, for each first source timing node:
  - determining a third aggregate set of timing constraints for timing paths from said first source timing node to said first sink timing node;
  - determining a fourth aggregate set of timing constraints for timing paths from a corresponding second source timing node to the corresponding second sink timing node;
  - determining whether the third set of timing constraints is equivalent to the fourth set of timing constraints;
  - responsive to determining that the third and fourth sets of timing constraints are not equivalent, indicating a mismatch between the first circuit configuration and the second circuit configuration; and
- for each (first source timing node, first sink timing node) pair where the third and fourth sets of timing constraints are determined to be equivalent, performing a third pass comprising, for each first intermediate timing node connected to a reconvergent point in the timing paths between said first source timing node and first sink timing node:
  - determining a fifth aggregate set of timing constraints for timing paths to said first intermediate timing node;

determining a sixth aggregate set of timing constraints for timing paths to a corresponding second intermediate timing node;

determining whether the fifth set of timing constraints is equivalent to the sixth set of timing constraints;

responsive to determining that the fifth and sixth sets of timing constraints are not equivalent, indicating a mismatch between the first circuit configuration and the second circuit configuration.

17. A computer-implemented system for comparing circuit configurations, the system comprising:

a computer processor; and a non-transitory computer-readable storage medium storing computer program modules configured to execute on the computer processor, the computer program modules configured to cause the processor to perform a computer implemented method comprising:

receiving, a first circuit configuration and a second circuit configuration; the first circuit configuration comprising a first set of timing nodes, first edges connecting the first set of timing nodes, and first timing constraints applicable to said first circuit configuration; the second circuit configuration comprising a second set of timing nodes, second edges connecting the second set of timing nodes, and second timing constraints applicable to said second circuit configuration; wherein timing nodes from the first circuit configuration are mapped to timing nodes from the second circuit configuration;

identifying a first source set of at least one timing node and a first sink set of at least one timing node in the first circuit configuration;

identifying a second source set of at least one timing node and a second sink set of at least one timing node in the second circuit configuration, the second source set corresponding to the first source set and the second sink set corresponding to the first sink set, the correspondence based on the mapping of timing nodes;

determining a first set of timing constraints, comprising aggregating timing constraints encountered in a traversal of timing paths from the first source set to the first sink set;

determining a second set of timing constraints, comprising aggregating timing constraints encountered in a traversal of timing paths from the second source set to the second sink set;

determining whether the first set of timing constraints is equivalent to the second set of timing constraints; and responsive to determining that the first and second sets of timing constraints are not equivalent, indicating a mismatch between the first circuit configuration and the second circuit configuration.

18. A non-transitory computer readable storage medium storing a computer program product including computer instructions configured to cause a processor of a computer to perform a computer-implemented method for comparing circuit configurations, the method comprising:

receiving, by a computer, a first circuit configuration and a second circuit configuration; the first circuit configuration comprising a first set of timing nodes, first edges connecting the first set of timing nodes, and first timing constraints applicable to said first circuit configuration; the second circuit configuration comprising a second set of timing nodes, second edges connecting the second set of timing nodes, and second timing constraints applicable to said second circuit configuration; wherein timing nodes from the first circuit configuration are mapped to timing nodes from the second circuit configuration;

identifying a first source set of at least one timing node and a first sink set of at least one timing node in the first circuit configuration;

identifying a second source set of at least one timing node and a second sink set of at least one timing node in the second circuit configuration, the second source set corresponding to the first source set and the second sink set corresponding to the first sink set, the correspondence based on the mapping of timing nodes;

determining a first set of timing constraints, comprising aggregating timing constraints encountered in a traversal of timing paths from the first source set to the first sink set;

determining a second set of timing constraints, comprising aggregating timing constraints encountered in a traversal of timing paths from the second source set to the second sink set;

determining whether the first set of timing constraints is equivalent to the second set of timing constraints; and responsive to determining that the first and second sets of timing constraints are not equivalent, indicating a mismatch between the first circuit configuration and the second circuit configuration.

19. The non-transitory computer readable storage medium of claim 18, wherein:

the first sink set consists of a single end point; and the first source set consists of all start points with at least a timing path from the source timing node to the single end point.

20. The non-transitory computer readable storage medium of claim 18, wherein:

the first source set consists of a single end point; and the first sink set consists of a single start point, the single start point having a timing path to the single end point.

21. The non-transitory computer readable storage medium of claim 20, further comprising, responsive to determining that the first and second sets of timing constraints are equivalent:

identifying a first reconvergent point on at least two timing paths between the first source set and the first sink set, and identifying a corresponding second reconvergent point on at least two timing paths between the second source set and the second sink set;

identifying a first timing node connected by a first edge to the first reconvergent point, and identifying a corresponding second timing node connected by a second edge to the second reconvergent point;

determining a third set of timing constraints, comprising aggregating timing constraints encountered in a traversal of timing paths from the first source set to the first timing node;

determining a fourth set of timing constraints, comprising aggregating timing constraints encountered in a traversal of timing paths from the second source set to the second timing node;

determining whether the third set of timing constraints is equivalent to the fourth set of timing constraints; and responsive to determining that the third and fourth sets of timing constraints are not equivalent, indicating a mismatch between the first circuit configuration and the second circuit configuration.

* * * * *